US006993052B2

(12) United States Patent
Desor et al.

(10) Patent No.: US 6,993,052 B2
(45) Date of Patent: Jan. 31, 2006

(54) SYSTEM AND METHOD FOR DELAY COMPENSATION FOR A PULSED LASER

(75) Inventors: Rainer Desor, Bovenden (DE); Thomas Wenzel, Goettingen (DE)

(73) Assignee: Lambda Physik AG, Goettingen (DE)

( * ) Notice: Subject to any disclaimer, the term of this patent is extended or adjusted under 35 U.S.C. 154(b) by 194 days.

(21) Appl. No.: 10/441,768

(22) Filed: May 20, 2003

(65) Prior Publication Data
US 2004/0004987 A1   Jan. 8, 2004

Related U.S. Application Data

(60) Provisional application No. 60/382,893, filed on May 22, 2002.

(51) Int. Cl.
H01S 3/00 (2006.01)
(52) U.S. Cl. ............................... 372/38.02; 372/38.03; 372/38.07; 372/57
(58) Field of Classification Search .................. 372/57, 372/38.01, 38.02, 38.03, 38.07
See application file for complete search history.

(56) References Cited

U.S. PATENT DOCUMENTS

| 4,611,270 | A |   | 9/1986 | Klauminzer et al. ........ 364/183 |
| 5,199,008 | A | * | 3/1993 | Lockhart et al. ............ 368/117 |
| 5,796,682 | A | * | 8/1998 | Swapp ........................ 368/120 |
| 5,836,004 | A | * | 11/1998 | Jiang et al. .................. 341/166 |
| 6,005,880 | A |   | 12/1999 | Basting et al. ................ 372/38 |
| 6,016,325 | A |   | 1/2000 | Ness et al. ..................... 372/38 |
| 6,052,395 | A |   | 4/2000 | Chiba ........................... 372/25 |
| 6,327,286 | B1 |  | 12/2001 | Ness et al. ................ 372/38.02 |
| 6,389,045 | B1 |  | 5/2002 | Mann et al. ................... 372/25 |
| 6,400,741 | B1 | * | 6/2002 | Matsunaga et al. ....... 372/38.02 |
| 6,529,531 | B1 | * | 3/2003 | Everage et al. ............... 372/20 |

OTHER PUBLICATIONS

W.S. Melville, "The Use of Saturable Reactors As Discharge Devices for Pulse Generators", *The Proceedings of the Institution of Electrical Engineers*, vol. 98, Part III, 1951, pp. cover sheet, Table of Contents iii-v, 185-206.

U.S. Appl. No. 09/858,147, filed May 14, 2001, Osmanow et al., entitled "Electrical Excitation Circuit for a Pulsed Gas Laser," 56 pages in length.

U.S. Appl. No. 09/922,222, filed Aug. 1, 2001, Desor, entitled "Delay Compensation for Magnetic Compressors," 46 pages in length.

U.S. Appl. No. 60/427,608, filed Nov. 18, 2002, Basting et al., entitled "Real-Time Electronic Circuit for Compensating Time Delay Jitter in an Excimer MOPA System," 30 pages in length.

U.S. Appl. No. 60/428,552, filed Nov. 21, 2002, Desor, entitled "Low Jitter Delay External Trigger-to-Light," 26 pages in length.

(Continued)

Primary Examiner—James Menefee
(74) Attorney, Agent, or Firm—Stallman & Pollock LLP

(57) ABSTRACT

Method and system provide a variable delay between the external trigger pulse for a laser system and the light pulse such that the total delay is controlled. The method and system utilize a digital time measuring circuit which measure a time interval which corresponds to a time between the generation of the trigger pulse and generation or a laser light pulse. Based on the measurement by the digital time measuring circuit a processor controls a delay circuit which thereby controls the time between the trigger pulse and the generation of the laser light pulse.

14 Claims, 13 Drawing Sheets

OTHER PUBLICATIONS

From http://www.acam.de/Content/gp1_e.HTM, printed page entitled: "TDC-GP1 ----- a TDC for general purposes -----," dated May 14, 2001, 1 page in length.

Manual by ACAM Mess Electronic, "TDC-GP1 General Purpose TDC 'Functional description'", Dec. 2, 2001, pp. 1-61.

* cited by examiner

SYSTEM AND METHOD FOR DELAY COMPENSATION FOR A PULSED LASER

PRIORITY

This application claims the benefit of priority to U.S. provisional patent application No. 60/382,893 filed May 22, 2002.

BACKGROUND OF THE INVENTION

1. Field of the Invention

The present invention relates to delay compensation for magnetic compressors in laser applications. In particular, the present invention relates to a method and system for providing temperature dependent delay compensation for magnetic compressors in excimer and/or molecular fluorine lasers.

2. Description of the Related Art

Magnetic compressors are widely used for applications that require short current pulses with high amplitude that exceed the specifications of commercially available semiconductor switches. For example, magnetic compressors can be found in excitation circuits for pulsed laser systems such as excimer or molecular fluorine lasers.

One disadvantage of magnetic pulse compression is that several factors influence the propagation delay through a magnetic compressor. For example, in an excitation circuit for an excimer laser, several stages of pulse compression can be used depending upon the compression factor as well as other requirements. A single compressor stage is typically made of a capacitor and a saturable inductivity that are comprised of a core made from a magnetic material and one or several windings.

The hold time, that is, the time needed to reach the saturation level and the low impedance state (referred to as switch through) is a function of the voltage across the core winding as well as other constraints such as the number of windings, the properties of the core material, and geometry, to name a few. This relationship can be seen from the following equation:

$$\int U dt = \text{constant} \tag{1}$$

However, it is recognized herein that in application, the constant in the above relationship is not constant, but dependent upon temperature as the saturation flux of the core material is temperature dependent. Indeed, it can therefore be seen that the delay may be influenced by several parameters including the change in the operating voltage of the laser as well as heat generated from the dissipated energy.

In particular, when the voltage applied to the compressor stages is changed from laser pulse to laser pulse, or less frequently, to maintain the output energy of the laser constant, the dependency of the delay to the applied voltage can be observed as a non-linear relationship. For example, when the operating voltage of the laser is increased, the delay will decrease as can be seen from equation (1) above, since the integral shown above is understood to be constant with respect to this relationship between operating voltage and delay time.

Moreover, with each laser pulse, energy is dissipated in the core and the windings into heat such that, depending on the repetition rate and the effectiveness of the cooling, the temperature of the magnetic compressor is likely to increase. In addition, when the laser is operated in burst mode, the temperature is likely to decrease when a pause between bursts of laser pulses occurs. The change in the temperature in turn, affects the delay in the following manner. First, the saturation flux of the core material decreases with increasing temperature, and vice-versa, which, in turn, will drive the core earlier into saturation and the delay will decrease in the range of approximately 40 ns/° K. Additionally, the capacity of the ceramic compressor capacitors decreases by approximately 0.5%/° K, thus increasing the voltage according to the equation set forth below:

$$E = (C/2) * U^2 = \text{constant} \tag{2}$$

such that $$U = \text{constant} * (1/C)^{1/2} \tag{3}$$

In the above, the main storage capacitor is taken to be a metal foil capacitor with a very small temperature coefficient (i.e., less than 0.01%/° K), and the stored energy is taken as constant at a fixed charging voltage and independent of the temperature.

It is recognized herein that the temperature dependence of the ceramic capacitors and/or saturable cores of a pulser circuit of a discharge circuit for an excimer and/or molecular fluorine laser can have a substantial influence on the delay due to the voltage changes by the capacitance modification. As can be seen from equations (1) and (3) above, thermally induced changes in capacitance can affect changes in charging voltage, and in turn, can affect changes in the delay. Moreover, the primary condenser may be a metal foil capacitor that does not indicate a substantial temperature dependence of the capacity, and thus, a loss of capacity of the ceramic capacitors leads to a rise in voltage, which then shortens the delay.

In general, a temperature dependent delay compensation circuit for a laser pulse circuit takes into account the temperature dependence of the delay due to the temperature fluctuations of the ceramic capacitors of the pulse compression stages of the pulser circuit. For instance, U.S. Pat. No. 6,016,325 discloses taking into account the temperature dependence of the saturation times of the saturable cores of the magnetic switch inductor elements of the circuit. The temperature of the cores is measured, and a delay is calculated based on the measured temperature, taking into account only the dependence of the saturation times of the saturable cores with temperature.

With so many factors affecting and potentially affecting the delay, measuring the temperature, taking into account the input voltage, burst information, etc., may still only allow an approximate delay compensation value to be estimated by calculation or using look-up tables such as temperature-delay compensation value tables, and/or including other input parameters such as high voltage, burst information, aging of components of the laser tube and/or discharge circuit. It is therefore desired to have a technique for stabilizing the delay between trigger pulse and electrical discharge for an excimer or molecular fluorine laser notwithstanding all the parameters such as temperature that fluctuate and influence the delay.

INCORPORATION BY REFERENCE

Figure 1:
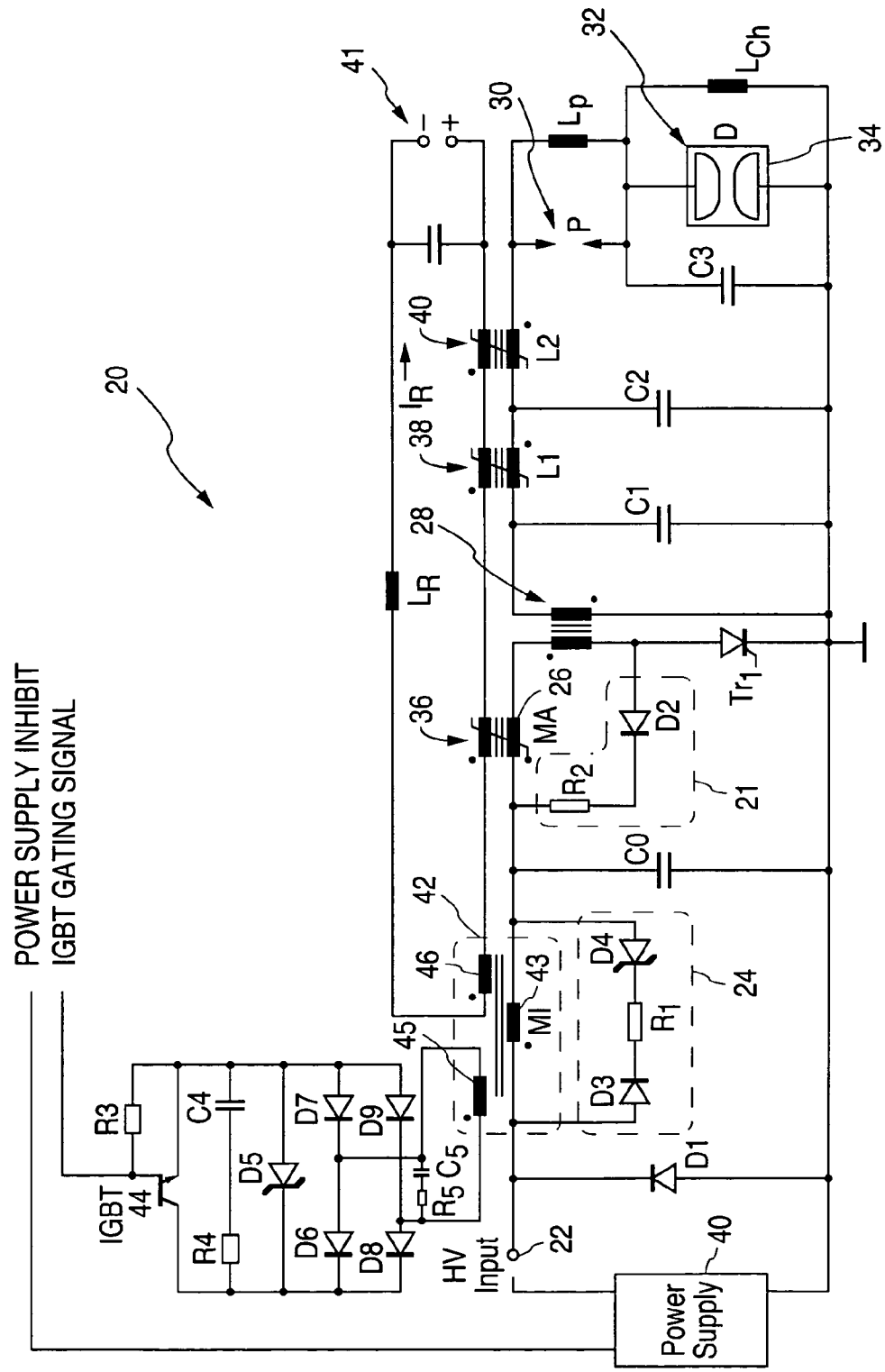
FIG. 1 schematically shows a high voltage power supply and pulse compression circuit according to a preferred embodiment.

The following references, in addition to the above background and invention summary, the drawings, the exemplary claims and the abstract of the disclosure, are hereby incorporated by reference into the present application, and are particularly incorporated by reference into the detailed description of the preferred embodiments as disclosing alternative arrangements of features or elements not otherwise set forth in detail below: German Patent Application DE 38 42 492, U.S. Pat. No. 6,005,880, U.S. Pat. No. 6,020,723, U.S. Pat. No. 5,729,562, U.S. Pat. No. 6,016,325, U.S. Pat. No. 6,243,405, and U.S. patent application Ser. Nos. 60/359,181, 09/858,147, 09/513,025, 60/281,305 and 09/838,715, which are assigned to the same assignee as the present application, the disclosures of each of which are incorporated herein by reference for all purposes.

DETAILED DESCRIPTION OF THE PREFERRED EMBODIMENTS

In typical pulsed light source applications like lithography it is often required that the delay between the trigger signal and the following light pulse is constant, because the object, which has to be irradiated, is moving during the exposure process. If the delay changes, the light pulse will irradiate the target at a wrong position.

If high optical output power levels with demanding requirements on the laser beam properties (bandwidth, wavelength stability etc.) are required, it might be advisable to use oscillator/amplifier systems. The oscillator can operate at low power level and produce a laser beam with the appropriate beam properties, meanwhile the amplifier is used to reach the required power level. Such oscillator/amplifier system requires that the electrical discharges are synchronized in a very narrow time range. Otherwise the amplifier will not reproduce the beam parameters of the oscillator, but emit broadband radiation or just ASE (Amplification of Spontaneous Emission). Therefore a delay compensation circuit is essential for such systems.

Usually all pulsed laser show a change in the delay between trigger and generated light pulse, especially when the laser is operated in a burst mode. The change appears in nearly all excitation circuits and is related with the HV switch and/or the magnetic pulse compression.

Pulse Compression

Magnetic compressors are widely used where short current pulses with high amplitude are needed, which exceed the specifications of commercially available semiconductor switches. In particular magnetic compressors are used in the excitation circuit for pulsed laser, especially excimer lasers.

A disadvantage of magnetic pulse compression is that several factors influence the propagation delay through a magnetic compressor.

In an excitation circuit for an excimer laser several stages of pulse compression can be used, depending on the compression factor and other requirements. The delays of the stages will add. A single compressor stage is usually made out of a capacitor and a saturable inductor, which again is build out of a core made out of a magnetic material and one or several windings.

The hold time, e.g. the time needed to reach saturation and to reach low impedance state (switch through) is a function of the voltage across the core winding and other constants (number of windings, core material properties, geometry etc.). This can be seen from the known equation:

$$\int U dt = constant$$

Unfortunately the constant is not really constant but temperature dependent, since the saturation flux of the material is temperature dependent.

Therefore the delay is influenced by several parameters:
1. The voltage applied to the compressor stages has to be changed from laser pulse to laser pulse or less frequent to keep the output energy of the laser constant, e.g. when the operating voltage of the laser is increased the delay will decreases, since the above integral is a constant (beside temperature influence). In other application the energy dose must be constant and the operating voltage is adjusted accordingly, resulting in increasing or decreasing delay depending on a reduced or increased operating voltage. This dependency is nonlinear.
2. With every laser pulse energy is dissipated in the core and the windings into heat. So depending on repetition rate and effectiveness of the cooling the magnetic compressor heats up. The temperature changes the delay by following effects:
   Σ The saturation flux of the core material is reduced with increasing temperature. This will drive the core earlier into saturation and the delay will decrease in the range of −40 ns/K.
   Σ The capacity of the ceramic compressor capacitors decreases by about 0.5%/K, therefore the voltage increases according to the equation $$E = \tfrac{1}{2} CU^2 = const$$

$$U = const^* \div 1/C$$

since the main storage capacitor is a metal foil capacitor, with very small temperature coefficient (<0.01%/K) and the stored energy is constant at a fixed charging voltage and independent of the temperature. Via the voltage effect described in 1. a temperature increase will lead to a delay decrease.

This second effect by the temperature coefficient of ceramic capacitors can be much bigger than the effect of the core heating and must also be taken into account.

Besides this main physical effects other conditions and parameters might also influence the delay, like imperfect resetting of the magnetic cores before the next pulse. Such effect will make the delay also repetition rate dependent.

HV Switch

Even excitation circuits without magnetic pulse compression might suffer from a delay change. If as an example a thyratron is used to switch the discharge directly, it is well known that the thyratron changes its delay with temperature. So in a burst pause the thyratron can cool down and the delay will increase.

To compensate the delay, two groups of effects can be distinguished:
1. The delay changes on a pulse to pulse base in an irregular not foreseeable manner. An example is the delay change produced when the HV value is changed from pulse to pulse. In principal these changes can be quite big up to several ms. A standard regulation loop has no chance to compensate the delay change.
   In this case a look up table with HV values and the corresponding delay values, which will be loaded in programmable delay lines to compensate the delay change as described in patent (Delay Compensation For Magnetic Compressors) is an appropriate mean.
2. The delay changes relatively slowly with a certain trend. The change from pulse to pulse is relatively small. An example is the temperature influence on the delay. Such change can be handled with a standard regulation loop.

In prior art of delay compensation circuits the temperature of the different components were measured and the related delay was used to program a function generator or to load programmable delay lines or to add the delay as offset onto existing delay tables. The measurement of the core or the capacitor temperature under high voltage condition and severe EMI environment is quite difficult and unreliable. The temperature measurement in the surrounding of the elements gives no good relation between the temperature and the delay. Other effects which will also influence the delay are not automatically compensated.

According to one embodiment herein, to compensate the slow small changes in the delay from pulse to pulse a regulation loop is provided; this regulation loop includes a time measuring circuit (sensor) and one or several programmable delay lines (actuator). Preferably a digital time measurement system is used, such as a TDC (Time to Digital Converter). One suitable TDC is provided by ACAM Messelectronic of Stuten-Blankenloch, Germany (website worldwide web "acam.de"). One TDC provided by ACAM which is suitable is the TDC-GP1. A TDC is a chip which can transform time intervals into digital values with high precision. A unique aspect of a TDC is that it has the ability to provide very high precision with a resolution which can be lower than 1 ns. The TDCs provided by ACAM are based on the use of digital propagation times, associated mainly with CMOS processors.

An embodiment of the system herein includes a TDC with a resolution of 125 ps and a peak-to-peak accuracy of about 500 ps. The resolution is about a factor 10 higher than described in conventional delay compensation circuits. The time range which can be measured is about 200 ns–200 ms. Some TDCs are able to measure the delay about 250,000 times per second, which is far above the typical pulsed excimer laser repetition rate, which is typically in the range of about 4 kHz. The typical natural jitter of an excimer laser is about ±1 ns to +/−5 ns depending on the HV switch used (thyratron, thyristor, IGBT, MOSFET etc.). The delay ranges between several 100 ns and several 100 ms, depending on the switch, the HV circuit and the charging principle.

Figure 10:
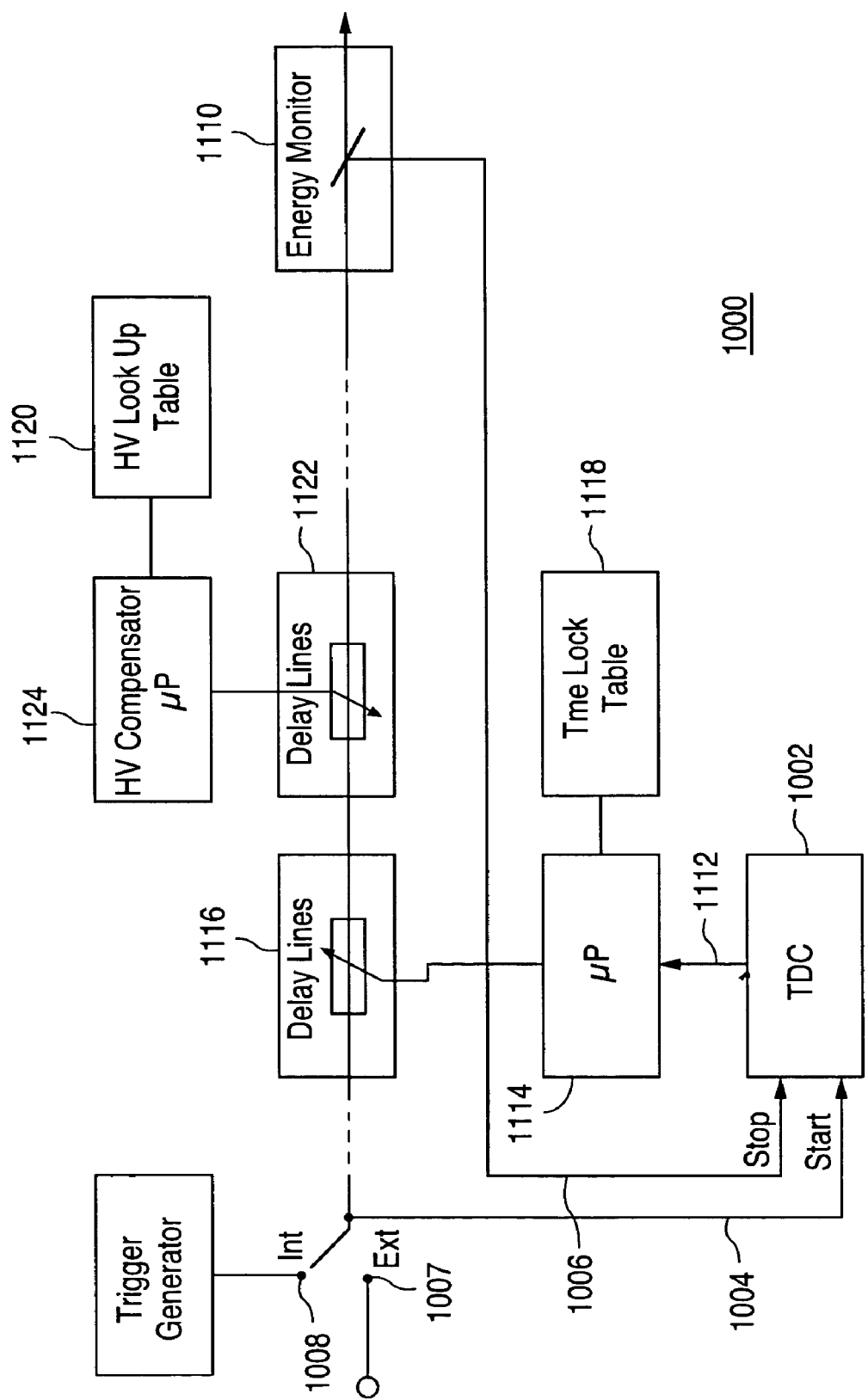
FIG. 10 schematically illustrates delay control components in accordance with a preferred embodiment.

FIG. 10 shows a block diagram of an embodiment of the delay compensation system 1000 in accordance with a preferred embodiment. The TDC 1002 preferably includes a start signal 1004 and a least one stop signal 1006. The start signal 1004 is preferably an external trigger signal 1007 or an internal trigger signal 1008 for the laser. The trigger signal is generated by a trigger signal generator. This trigger signal is applied to a switch of a discharge circuit, and results in the discharge circuit outputting an electrical pulse to electrodes of a laser chamber which result in a laser light pulse.

The stop signal 1006 is preferably either the generated laser light pulse (derived from the laser internal energy monitor or from an external photodiode including a pulse converter to TTL) or the electrical discharge (a pick-up sensor detects the peaking current increase and generates a TTL stop signal), but in either case the stop signal 1006 corresponds to the generation of the laser light pulse. In both of these cases some type of detector is used as an energy monitor 1110 to generate the stop signal 1006. Thus, given that the light pulse is generated in response to the discharge of the electrical pulse across the electrodes, the stop signal, whether the stop signal is generated based on sensing the actual discharge of the electrical pulse across the electrodes, or based on sensing the generation of the light pulse, is generated at a time which corresponds to the discharge of the electrical pulse. Similarly this also means that the stop signal is generated at a time which corresponds the generation of the light pulse. The TDC 1002 preferably delivers directly a digital value in the unit ns (nanoseconds) for the delay between the start signal 1004 and the stop signal 1006. This value is transferred via a delay signal 1112 to a microprocessor 1114, which will preferably load attached programmable delay lines 1116 according to a calculation algorithm. This digital loop allows a very flexible adaptation to different regulation algorithm, which can be easily changed via the programming of the microprocessor 1114.

This type of regulation loop may or may not stabilize sudden steps in the delay, which can appear for the first pulse in a burst, if the burst pause was so long that, for example, the temperature of the compressor components changed. Also, a thyratron can cool down during a burst pause and therefore change its delay.

To overcome this first value problem it is possible to use a regulation scheme similar to the PowerLok™ scheme used for the energy regulation (see U.S. Pat. No. 4,611,270 and U.S. patent application Ser. No. 09/688,561, which is assigned to the same assignee as the present application, and each is hereby incorporated by reference). A self-learning look up table is preferably used for the first values. This look up table is referred to in FIG. 10 as TimeLok™. This self-learning look up table 1118 is then accessed and utilized by the microprocessor 1114.

For the compensation of a fast unforeseeable delay change due to the change of the high voltage on a pulse to pulse basis, preferably a HV look up table 1120 with accompanying delay lines 1122 and HV compensation microprocessor 1124 is integrated inside the TimeLok loop, or used in conjunction with the TimeLok loop (see FIG. 10). It should be noted that although FIG. 10 shows HV compensation processor 1124 as being separate from the microprocessor 1114, a single microprocessor could be programmed to provide for analyzing the digital delay interval signal 1112 and the analyzing of a signal which corresponds to the value of a high voltage applied to the discharge circuit. Such a processor would provide for adjustments of either two separate delay circuits such as 1116 and 1122, or alternatively the function of the delay circuits 1116 and 1122 could be combined into a single delay circuit.

This leads to a substantially constant delay in relation to the variation of the HV and to a substantially constant delay in relation to variation of the temperature and other effects.

For background and context, further discussion is provided of other previous embodiments which are subject of other patent applications, assigned to the assignee of the present patent application. However, the principles of the present application are discussed above in connection with FIG. 10. This should not be construed as implying that the claims of the present application are limited to the specific combination shown in FIG. 10, rather the claims and their equivalents define the scope of the present application. Further, it should be recognized that the delay control system described in connection with FIG. 10, could be used in combination with the other aspects of laser systems, such as those discussed below.

In another system embodiment, a method for providing a substantially constant propagation delay between a trigger pulse and a light pulse of a discharge circuit for an excimer or molecular fluorine gas discharge laser system is provided. The method includes monitoring a delay time between the trigger pulse that initiated the light pulse and a feature of the temporal profile, and controlling the delay time by controlling delay circuitry to stabilize the delay time around a predetermined value based on the monitored delay time between the trigger pulse and the feature of the temporal profile. The method may include monitoring the feature of the temporal profile of the light pulse and/or the temporal profile itself. The method may further include comparing the monitored delay time between the trigger pulse and the feature of the temporal profile with the predetermined value, and adjusting the delay time by a deviation amount between the monitored delay time and the predetermined value.

The monitored feature of the temporal profile includes the leading edge, center of gravity, maximum or falling edge of the temporal profile, or a leading or falling edge or a maximum of a sub-peak within the temporal profile, or a minima within the temporal profile.

The method may further include controlling one or more parameters that influence the delay time to reduce fluctuations in the delay time due to fluctuations in the parameter. The one or more parameters may include a temperature of components of the pulser circuit such as one or more stage capacitors. The method may include flowing a cooling fluid to stabilize the temperature of the one or more stage capacitors.

A method for controlling pulse energy overshoot for an excimer or molecular fluorine laser system is also provided including measuring a temperature of one or more components of the laser system that influence the pulse energy overshoot, determining a high voltage offset compensation value based on the measured component temperature, and factoring the high voltage offset compensation value into a high voltage value for generating one or more pulses at the start of a pulse burst. The one or more laser system components may include condensers of a pulser circuit of the laser system and/or a laser gas mixture of the laser system. The method may further include controlling a composition of the gas mixture to reduce the degree of pulse energy overshoot, such as by including a trace concentration of a gas additive in the laser gas mixture. The high voltage value, which is used for factoring the high voltage offset compensation value therewith, may be already compensated from steady state values for pulses occurring later in the burst.

In U.S. patent application Ser. No. 09/922,222, which is assigned to the same assignee as the present application and is hereby incorporated by reference, a method is described and set forth below for providing a substantially constant propagation delay between a trigger pulse and a light pulse of a discharge circuit for an excimer or molecular fluorine gas discharge laser system is provided including operating the excimer or molecular fluorine laser system, measuring a temperature corresponding to a temperature of a magnetic compressor including at least one stage capacitor of the discharge circuit, and calculating a corrected delay offset value including a delay dependence corresponding to a capacitance dependence of the at least one stage capacitor on the measured temperature. The propagation delay between the trigger pulse and the light pulse including the corrected offset value is approximately a predetermined propagation delay.

The '222 application, and see below, describes a discharge circuit for an excimer or molecular fluorine laser system including a substantially constant propagation delay between a trigger pulse and a light pulse is also provided including a high voltage control board for controlling delay lines which control the propagation delay, a switch trigger, a switch, a high voltage power supply, one or more pulse compression stages including a stage capacitor and a stage inductor, a temperature circuit for obtaining a temperature value corresponding to a temperature of the one or more pulse compression stages, and a laser controller for receiving the temperature value, calculating a corrected delay offset value including a delay dependence corresponding to a capacitance dependence of the one or more stage capacitors on the measured temperature, the corrected offset value for use by the high voltage control board for controlling the propagation delay, so that the propagation delay between the trigger pulse and the light pulse including the corrected offset value is approximately a predetermined propagation delay.

The '222 application, and again see below, describes an excimer or molecular fluorine laser system including a substantially constant propagation delay between a trigger pulse and a light pulse is also provided including a discharge tube filled with a gas mixture including at least including a halogen containing species and a buffer gas, multiple electrodes within the discharge tube, a resonator for generating a laser beam, a laser controller, and a discharge circuit for supplying electrical pulses to the multiple electrodes. The discharge circuit includes a high voltage control board for controlling delay lines which control the propagation delay, a switch trigger, a switch, a high voltage power supply, one or more pulse compression stages including a stage capacitor and a stage inductor, and a temperature circuit for obtaining a temperature value corresponding to a temperature of the one or more pulse compression stages. The laser controller is configured to receive the temperature value, calculate a corrected delay offset value including a delay dependence corresponding to a capacitance dependence of the one or more stage capacitors on the measured temperature, the corrected offset value for use by the high voltage control board for controlling the propagation delay, so that the propagation delay between the trigger pulse and the light pulse including the corrected offset value is approximately a predetermined propagation delay.

These and other features and preferred components and methods of the '922 application are set forth below with reference to FIGS. 1–4, wherein many of the features described with reference to FIGS. 1–4 are incorporated by reference into the preferred embodiments described thereafter with reference to FIGS. 5–8 AND 9A–9E. That discussion of the preferred embodiments with particular reference to FIG. 5 sets forth advantageous techniques for stabilizing the delay between trigger pulse and electrical discharge for an excimer or molecular fluorine laser notwithstanding all the parameters such as temperature that fluctuate and influence the delay. In that discussion is described a technique wherein a feature of the temporal profile of the generated light pulse is measured or monitored, such as the leading edge, e.g., and the delay between the trigger pulse and this feature of the temporal profile are determined. If the determined delay varies from a predetermined or stabilized value, then the delay is compensated the appropriate amount to adjust the delay to the predetermined or stabilized value.

Figure 5:
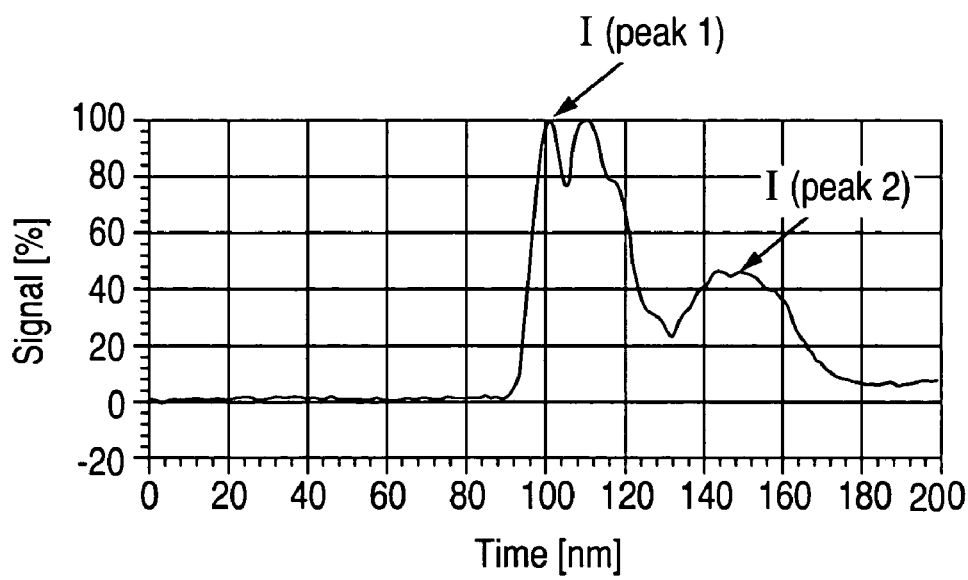
FIG. 5 graphically illustrates a temporal profile of an excimer or molecular fluorine laser pulse.
Figure 6A:
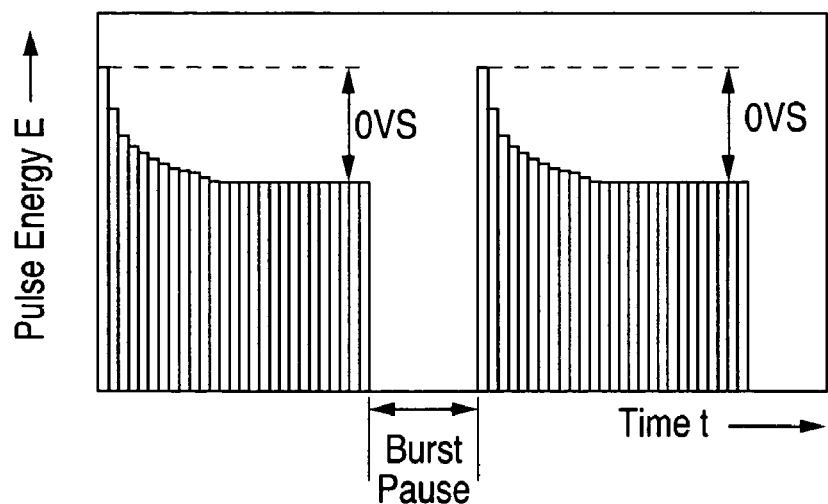
FIG. 6a illustrates burst mode overshoot of an excimer or molecular fluorine laser system.
Figure 6B:
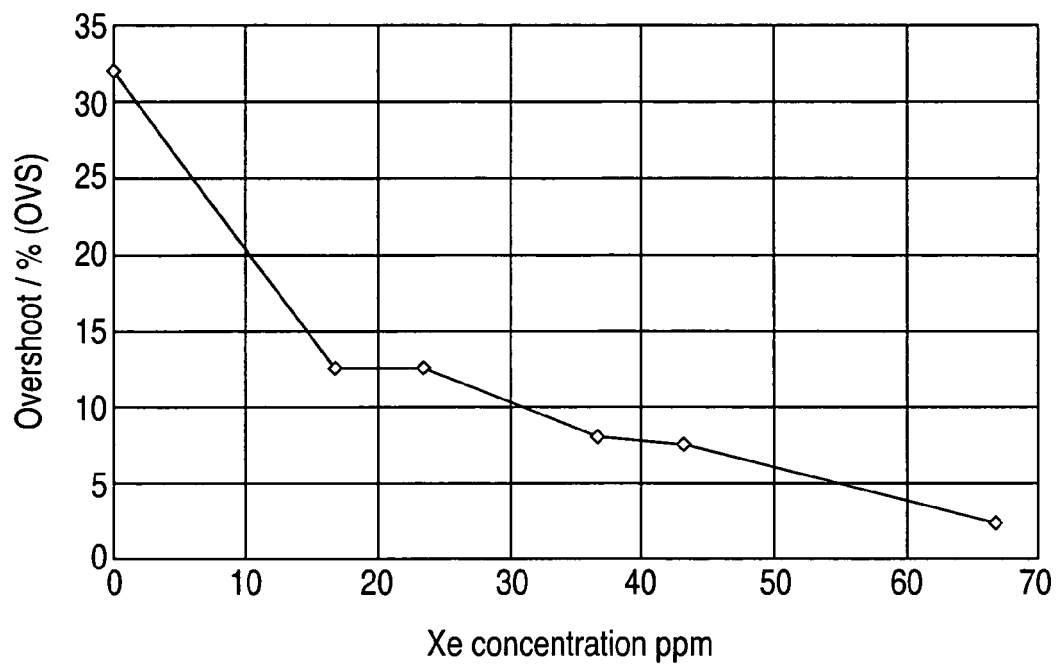
FIG. 6b illustrates control of overshoot by control of gas mixture concentration of an excimer or molecular fluorine laser system, particularly using a gas additive.
Figure 6C:
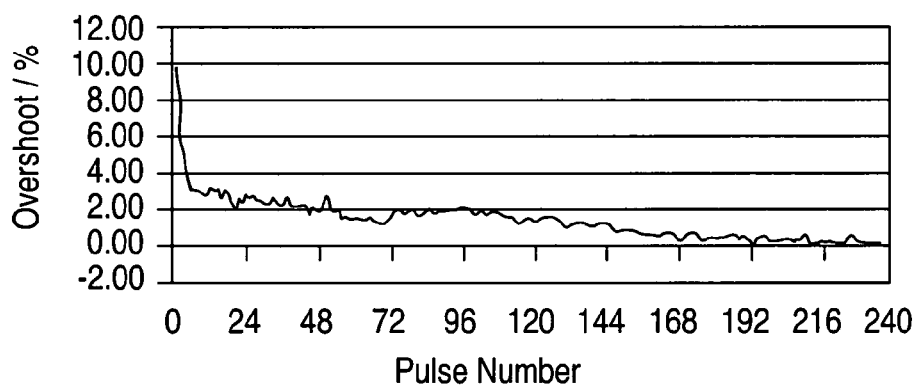
FIG. 6c illustrates a reduced overshoot of an excimer or molecular fluorine laser including a gas additive in its gas mixture.
Figure 7:
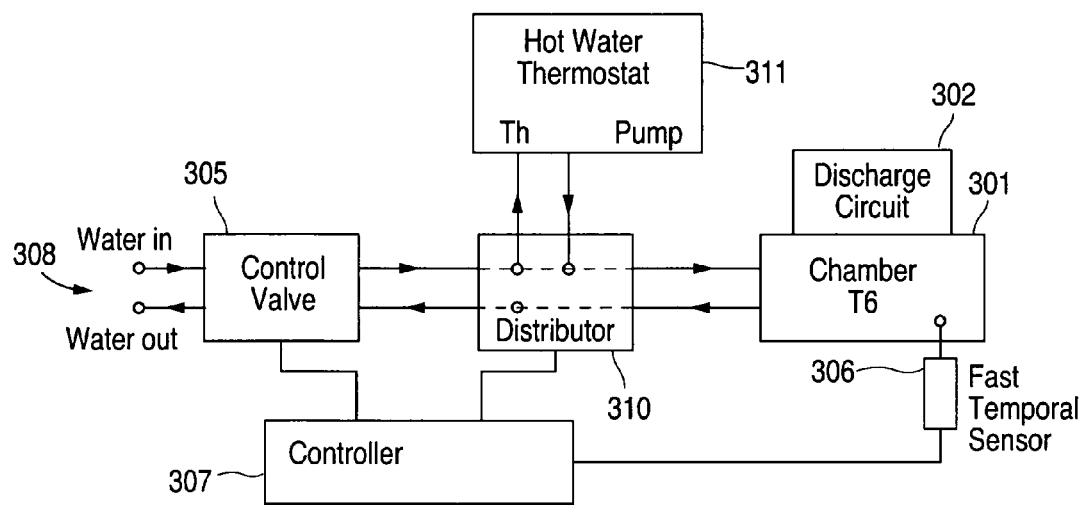
FIG. 7 illustrates components of an excimer or molecular fluorine laser system including gas mixture temperature control.
Figure 8:
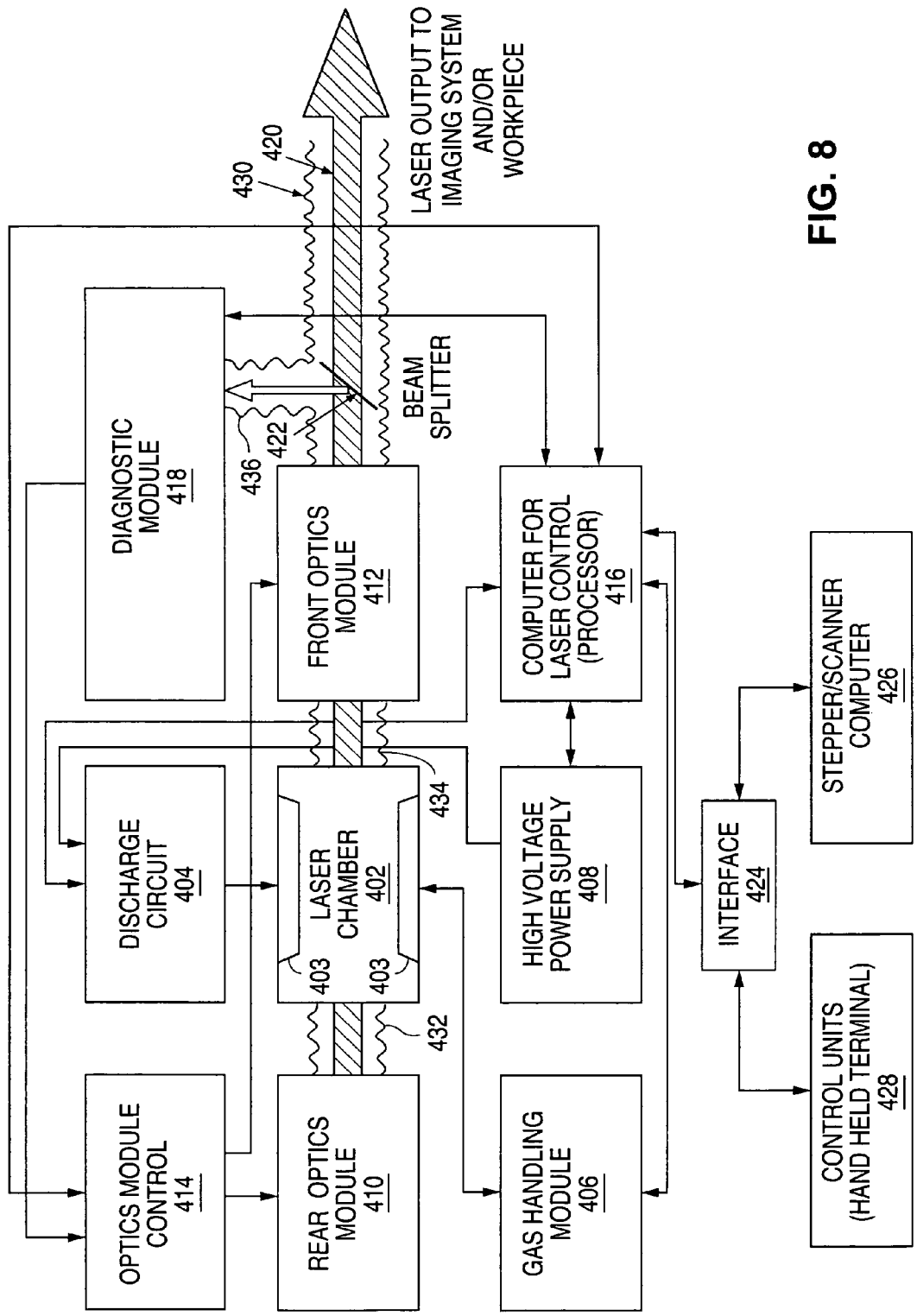
FIG. 8 schematically illustrates an overall excimer or molecular fluorine laser system according to a preferred embodiment.
Figure 9A:
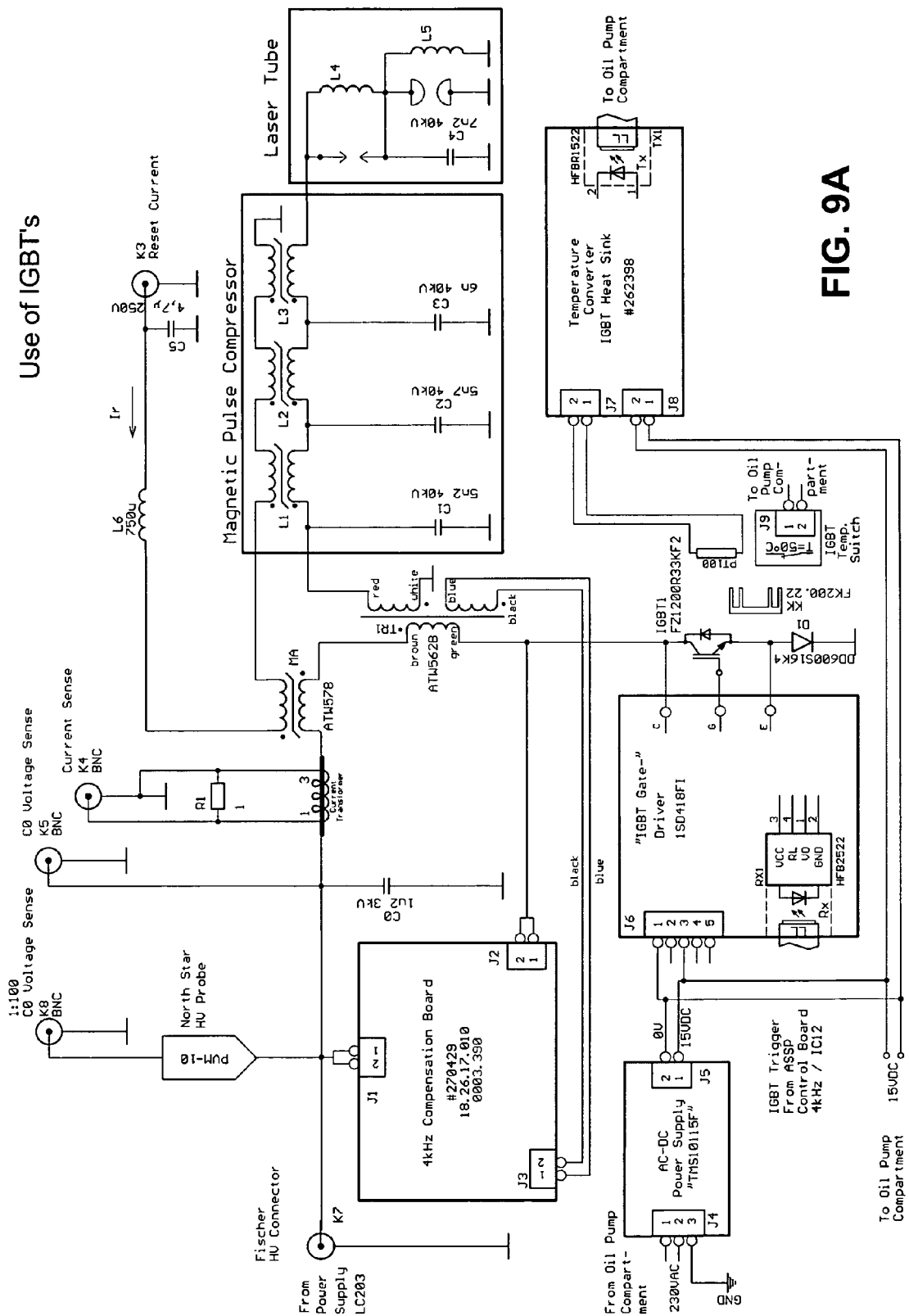
FIGS. 9A–9C schematically show another high voltage power supply and pulse compression circuit according to a preferred embodiment.
Figure 9B:
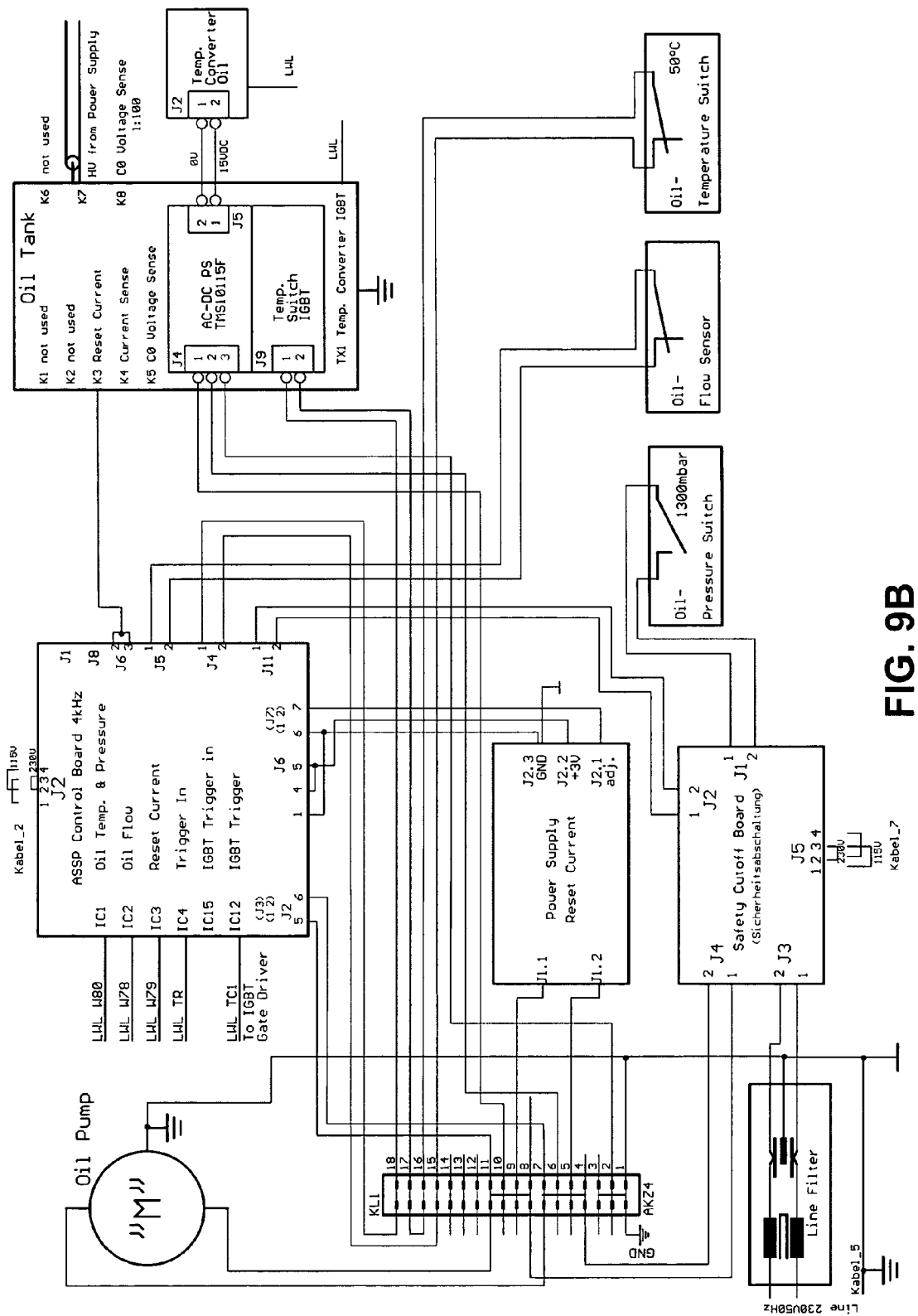
Figure 9C:
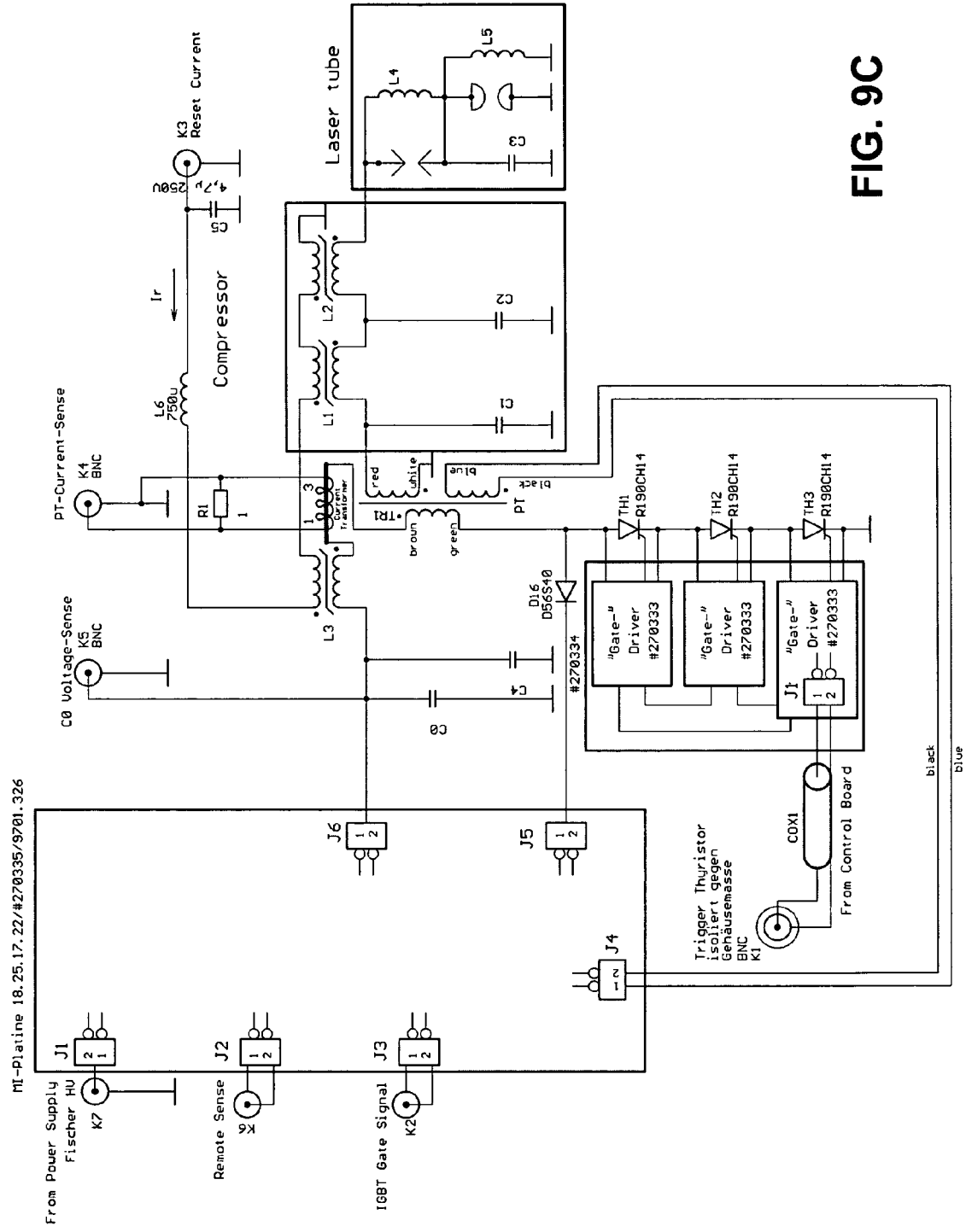
Figure 9D:
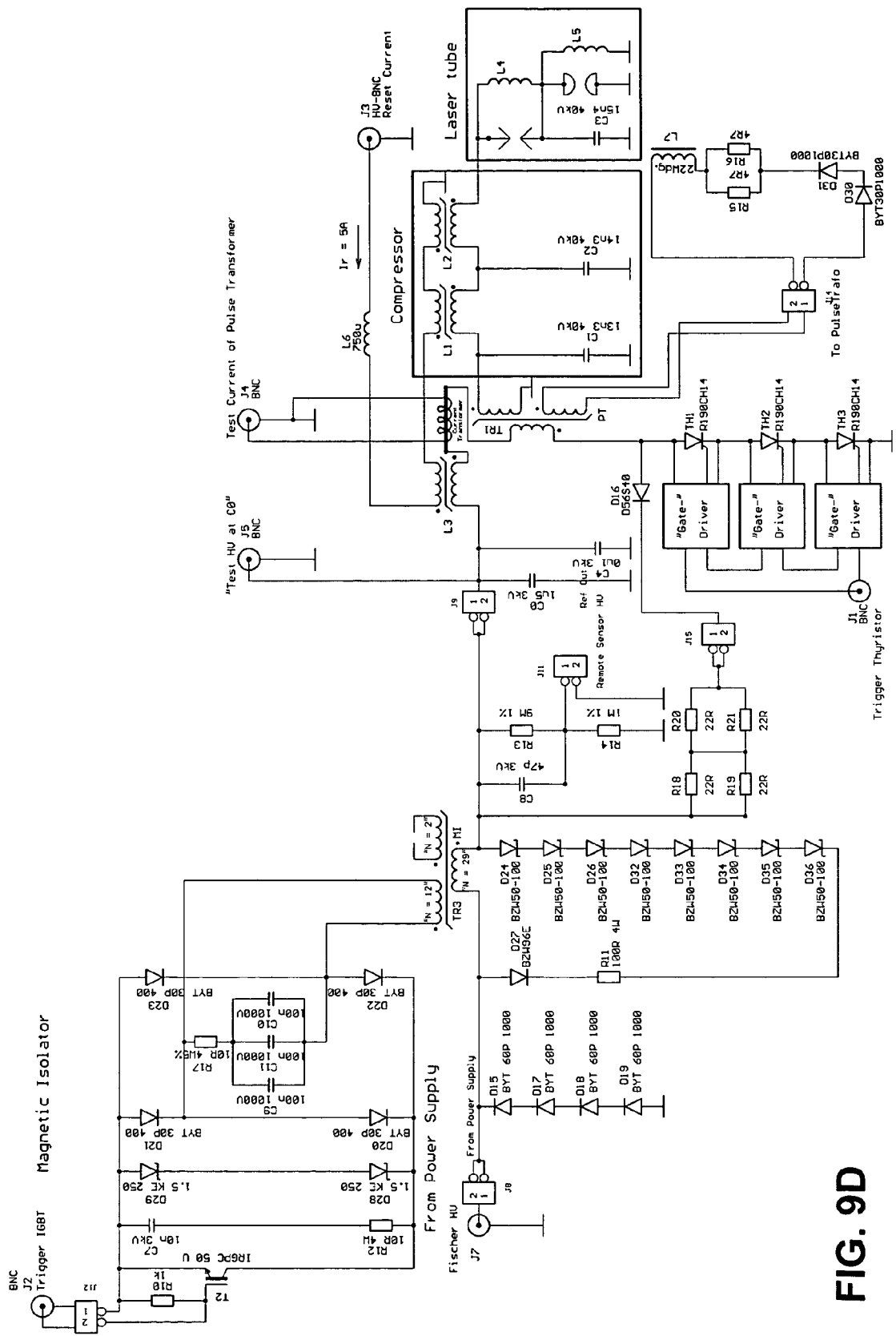
FIGS. 9D–9E schematically show another high voltage power supply and pulse compression circuit according to a preferred embodiment.
Figure 9E:
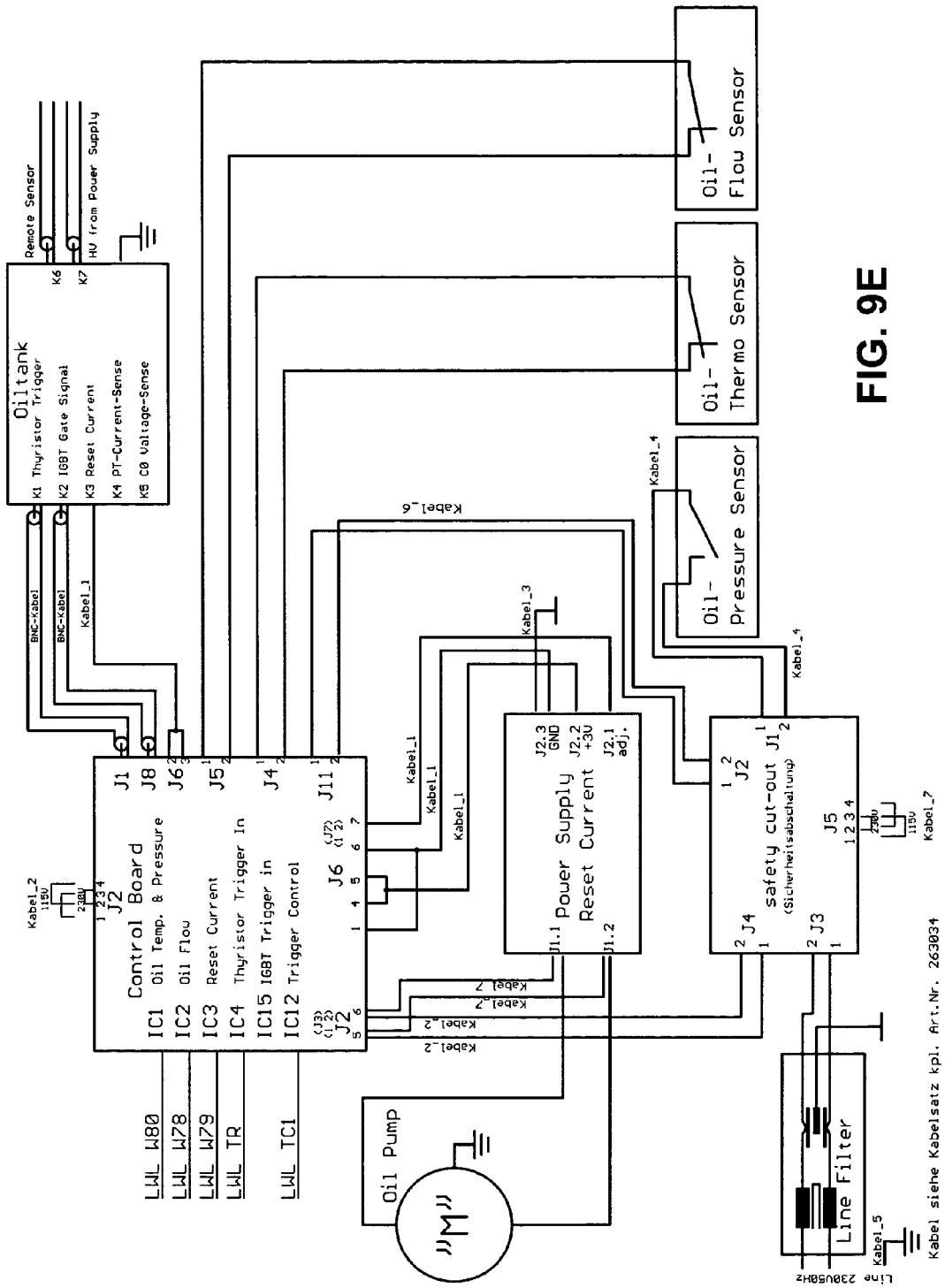

It is further set forth herein with reference to FIGS. 6a–6c, that a measurement of the temperature of high voltage condenser components of the pulser circuit, e.g., ceramic condensers, may be further used to control the input voltage, and output pulse energy, for the first few pulses in pulse bursts when the excimer or molecular fluorine laser is operating in burst mode, for providing overshoot control. During laser operation, particularly at high repetition rates, the temperature of the ceramic HV condensers tends to increase, and during a burst pause, these temperatures can cool off significantly enough to affect the input voltage to the electric discharge of the laser, and thus the energy of the output pulse. By measuring the temperature of the ceramic condensers, a compensation HV value can be figured into the applied voltage. In this way, the energy overshoot that is characteristic of burst mode operation can be reduced or substantially avoided. This overshoot control based on condenser temperature can be combined with further overshoot control techniques, such as may relate to the influence of the burst pauses on, e.g., the gas mixture, (see FIGS. 6b–6c), to provide pulse bursts with substantially reduced or avoided energy overshoot. Another example of such a technique that may be combined with the preferred techniques for reducing and/or controlling overshoot is schematically illustrated at FIG. 7 which shows a gas mixture temperature regulation loop for controlling the gas mixture temperature around a predetermined value, particularly during a burst pause and/or at the time of the first few pulses in pulse bursts. Finally, FIG. 8 schematically illustrates an overall excimer or molecular fluorine laser system according to a preferred embodiment, wherein the preferred embodiments shown and described with reference to FIGS. 1–7 are preferred combined with features of that overall laser system illustrated at FIG. 8.

An all-solid-state switched pulser (ASSP) 20 constructed in accordance with a preferred embodiment for the excitation of excimer or molecular fluorine lasers will now be discussed. A preferred overall excimer or molecular fluorine laser system is set forth below with reference to FIG. 8. The circuit diagram of the pulser 20 is shown in FIG. 1. Initially the primary storage capacitor $C_0$ is charged by a switched mode power supply 40, connected to the high voltage input terminal 22. The HV input 22 is shown connected to the primary storage capacitor $C_0$ through the primary winding 43 of a magnetic switch controlled isolator (MI) 42, which may be excluded from other embodiments. The primary storage capacitor may be incorporated within a power supply module together with the power supply 40 shown in FIG. 1. When the desired charging voltage on $C_0$ has been reached, solid state switch $Tr_1$, which is preferably IGBT-based, and alternatively thyristor- or thyratron-based, is triggered and the energy stored in $C_0$ is resonantly transferred through the magnetic assist (MA) 26 and the pulse transformer 28 to capacitor $C_1$. An alternative circuit may be such as to not include the transformer and/or may include a voltage doubling circuit (see U.S. patent application Ser. No. 09/858,147, which is assigned to the same assignee as the present application and is hereby incorporated by reference; see also the references cited below in the discussion relating to FIG. 8). The switched voltage in the primary loop of the pulse transformer 28 is of the order of 2 kV, which is stepped up on the secondary winding to around 20 kV, which illustrates a voltage level that may be used to switch the laser.

The MA 26 shown includes a saturable inductor, which is initially reverse biased to provide a hold-off time during which the current flow through the switch $Tr_1$ is delayed to enable carrier diffusion spreading. This results in an increased current rise capability of the switch $Tr_1$ when MA is driven into saturation, allowing the full current to flow. The MA delays the current flow by virtue of the fact that it, in its unsaturated state, initially introduces a large inductance in series with the switch $Tr_1$. It then goes into saturation, allowing a large current flow through its small saturated inductance. The primary pulse transfer time is of the order of 4 µs which is reduced, as shown, by two pulse compression stages, including $C_1$-$L_1$-$C_2$ and $C_2$-$L_2$-$C_3$, to a pulse time of 100 ns, resulting in a voltage rise time over the discharge electrodes of 100 ns. The laser is preionized during the charging phase of capacitor $C_3$ by a preionizer 30, which may be a corona, sliding surface or spark gap preionizer 30, which carries the charging current. The fast rising voltage pulse on $C_3$ breaks down the discharge gap 34 between a pair of elongated main discharge electrodes of the laser 32 and the energy stored on $C_3$ is deposited into the discharge gap 34. The inductors $L_{Ch}$ and $L_P$ are used for providing a current path for the leakage current through inductors $L_1$ and $L_2$ used to drive $L_1$ and $L_2$ into saturation. $L_{Ch}$ is also used to ensure that the capacitor $C_3$ returns to ground potential after a discharge.

Imperfect impedance matching between the pulse compression circuit and the discharge gap 34 may result in voltage reversal on $C_3$, which is transmitted through the pulse compressor and pulse transformer 28 in reverse direction, causing in time succession the voltages on $C_2$, $C_1$ and $C_0$ to be inverted. The snubbing circuit 21 on the pulse transformer primary loop, including of $D_2$ and $R_2$ will connect a negative voltage on $C_0$ directly to the switch $Tr_1$ and will protect the switch $Tr_1$ against load faults by absorbing part of the reflected energy which could otherwise result in catastrophic failure of the switch $Tr_1$.

The MA and inductors $L_1$ and $L_2$ are reset into reverse saturation by a dc bias current $I_R$ through auxiliary secondary reset windings 36, 38, and 40. The polarity indications on MA, $L_1$ and $L_2$ inductors indicate the current flow directions The polarity of MA is different from that of $L_1$ and $L_2$ since the pulse transformer 28 inverts the positive polarity as indicated on the primary and secondary windings of the pulse transformer 28. (The polarity indications, are used in a manner consistent with standard practice. Specifically, polarity indications on the transformer symbols indicate the relationship between current flow in one winding and the induced current in the second winding.) The $I_R$ current is supplied by the biasing circuit 41. The biasing current is used for the correct operation of the pulse compressor in forward direction, while the compressor is automatically biased for correct operation in the reverse direction. Such biasing is well known in the art. See Melville, 1951, "The use of saturable reactors as discharge devices for pulse generators," which is hereby incorporated by reference.

The negative voltage building up on $C_0$ can be partly due to energy reflected back from the preionizer 30, the discharge gap 34 and a mismatch between $C_0$ and $C_1$. Negative voltages of typically a few hundred volts are reached on $C_0$. A negative voltage on $C_0$ is desirable because this negative voltage aids in the commutation of the switch $Tr_1$.

However, the inverse voltage on $C_0$, on the power supply 40 side may cause a positive current through the components of the power supply connected to the input terminal 22 which partially discharges $C_0$. This current is preferably limited in order to avoid overloading of the components 6f the power supply 40. The current could be reduced to a safe value by introducing a charging and isolation resistor between power supply and $C_0$. This, however, would cause high losses during the charging cycle. Various combinations of charging inductors and parallel resistors could also be employed but it was found that a charging inductor of a suitable value to protect the power supply, can interfere with the voltage regulation of the power supply, resulting in poor shot to shot voltage stability. Even a remote voltage sensor on $C_0$ tends not to improve voltage regulation because of the high impedance introduced between power supply and capacitor $C_0$ which prevents fast capacitor charging required for kHz operation. The ideal charging element will have a low impedance during the charging cycle, reducing charging losses and enabling voltage regulation, and a high impedance during the pulsing cycle, effectively isolating power supply and load.

During the primary energy transfer from $C_0$ to $C_1$, the voltage on $C_0$ is inverted to a negative voltage of a few hundred volts. This takes place from about 0 to 50 $\mu$s. The negative voltage on $C_0$ appears over the primary winding 43 of the reverse biased MI 42, if used, and the switch $Tr_1$.

The laser controller (not shown) switches the IGBT 44 to the on-state slightly before the removal of the inhibit signal from the power supply, enabling the charging cycle. The inhibit signal is generated in the control electronics. Since the time duration during which the inhibit signal is applied to the power supply is significantly longer than that necessary for commutation of $Tr_1$, a fixed timing, independent of repetition rate, can be used. The IGBT 44 now effectively short-circuits the secondary winding 45 of the MI 42 so that the power supply 40 only sees the small leakage inductance of the primary winding 43 of approximately 50 $\mu$H or less which does not impede the charging process. The snubber circuit 24, diode $D_5$, and the RC-combination $C_5$, $R_5$ may be used to protect the IGBT 44 from over voltage spikes. $D_6$–$D_9$ may be used as a bridge rectifier to ensure always the correct polarity for the IGBT 44. The resistors $R_3$ and $R_4$ and capacitor $C_4$ protect the IGBT 44. The diode $D_1$ is in parallel to the power supply to ensure that the inverted voltage on $C_0$ does not cause a large forward current from the power supply, which could damage its output diodes.

An alternative embodiment of the pulse transformer 28 may have an auxiliary third winding with five turns, as shown in U.S. Pat. Nos. 6,020,723 and 6,226,307, which are hereby incorporated by reference. A voltage clamping circuit may be connected across this third winding to serve to absorb part of the reflected energy that in the case of load failure could damage switch $Tr_1$.

Negative voltage snubbing of $C_0$ has often been carried out with dissipative elements thereby wasting the energy stored in the negative charge of $C_0$ (See, A. L. Keet and M. Groeneboom, 1989, "High Voltage Solid-State Pulser for High Repetition Rate Gas Laser," EPE conference, Aachen; and U.S. Pat. No. 5,177,754, "Magnetic Compression Laser Driving Circuit", which are each hereby incorporated by reference). Power supply pulser isolation has also been carried out using series charging inductors or resistors. Additional high voltage switches may also be inserted between power supply and pulser. Accurate control of the negative voltage phase on $C_0$ to aid switch commutation is generally a complex issue, especially under high repetition rate operation of the laser.

Figure 2:
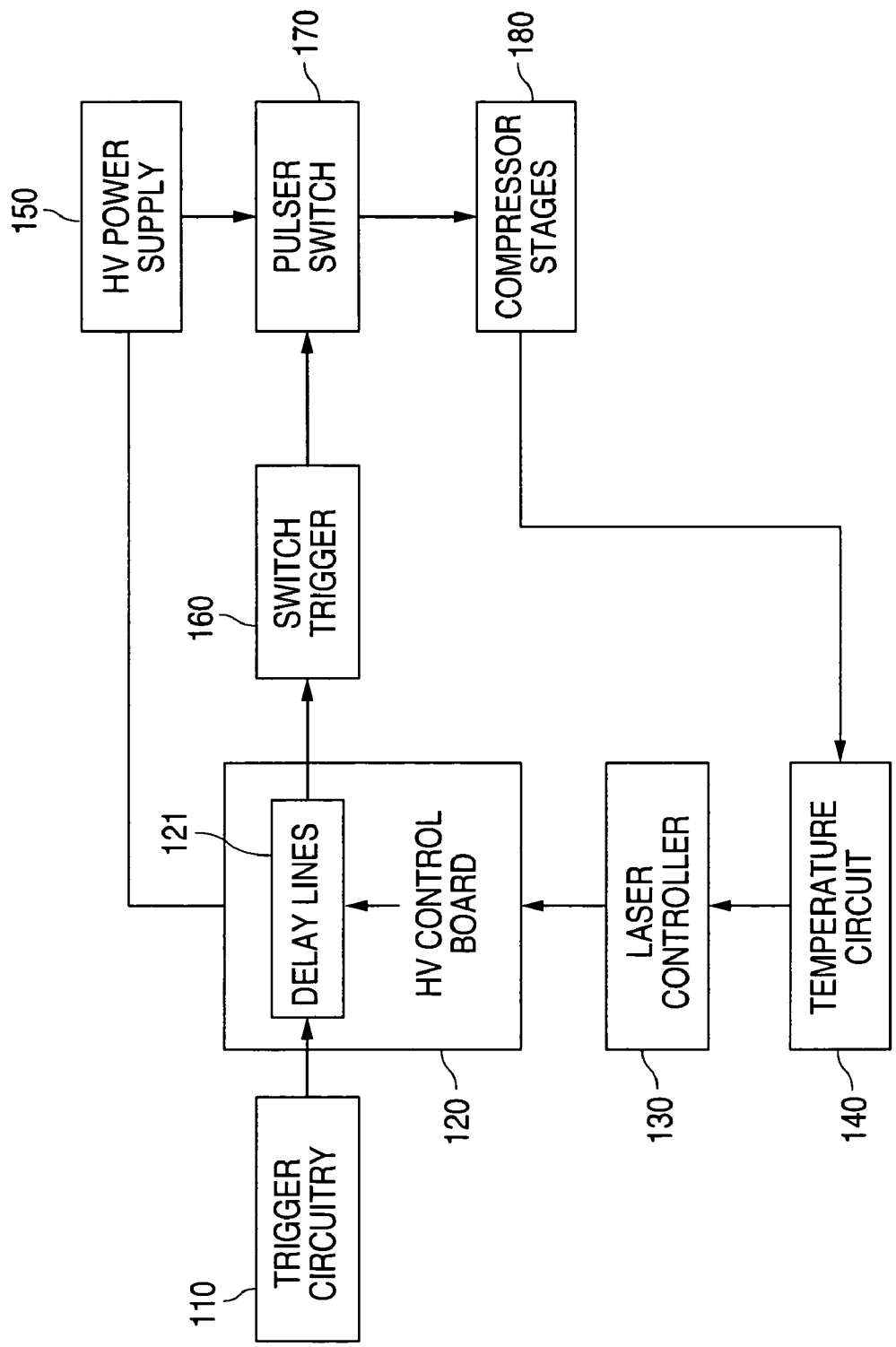
FIG. 2 illustrates a block diagram of the delay compensation system in accordance with a preferred embodiment.

FIG. 2 illustrates a block diagram of the delay compensation system in accordance with a preferred embodiment. Referring to FIG. 2, there is provided a variable delay unit 120 provided between a trigger circuitry 110 and pulser switch 170. More specifically, to determine an accurate delay compensation according to particular applications, delay dependencies are measured and delay lines 121 are programmed with the inverse function to maintain the total delay as a constant. In one approach, the voltage dependency may be automatically measured with an external computer system by changing the HV in small steps in a predetermined applicable range and then measuring the related delay with an oscilloscope which may be configured to communicate with a computer or the like. Thereafter, software loaded on the computer communicating with the oscilloscope may be configured to generate pairs of HV and delays, and to search for the largest delay value. From the largest delay value, each actual measured delay value may be subtracted, resulting in the delay values for the delay lines 121 for each measured HV. These determined data pairs may then be converted into a predetermined data format for the laser controller 130 and stored therein as a data file, for example.

More specifically, in one embodiment, the data file may be installed in the laser controller 130 and downloaded onto the HV control board 120 as a look-up table. As can be seen, the HV control board 120 may be configured to include the delay lines 121 in one embodiment. Since the HV control board 120 knows the required HV value for each laser pulse, in one aspect, the HV control board 120 may be configured to transmit the HV value to the power supply 150 and to load the corresponding delay values onto the delay lines 121. The switch trigger 160 in the pulsed power module shown in FIG. 2 may be configured to be guided through the delay lines 121 to add the respective delays, such that the total delay between trigger circuitry 110 and the pulser switch 170 is maintained substantially constant. This approach is particularly suitable since the HV value may change from laser pulse to each successive laser pulse.

Since the temperature change is relatively slow, the temperature compensation does not have to be as fast as the HV compensation. In one embodiment, the temperature of the cores and capacitors is measured by temperature circuit 140 at five second intervals. The required change in the delay is then added as an offset to the delay table and downloaded to the HV control board 120 to replace or update the look-up table loaded therein. Alternatively, the value may be used in a delay compensation calculation including computing a delay compensation based on a formula that includes the temperature-based delay offset.

In the manner described above, in accordance with one embodiment herein, delay compensation for magnetic compressors in a pulsed power module may be provided without employing A/D converters nor measuring the HV. Indeed, since the laser controller 130 commands the HV power supply 150 by a digital value and loads the delay lines 121 with a digital value representing the required delay for compensation at the particular HV, the process may be performed without measuring the HV and without using A/D converters. Moreover, in the approach, a pulser specific delay table may be generated which compensates for variations in the materials.

Figure 3:
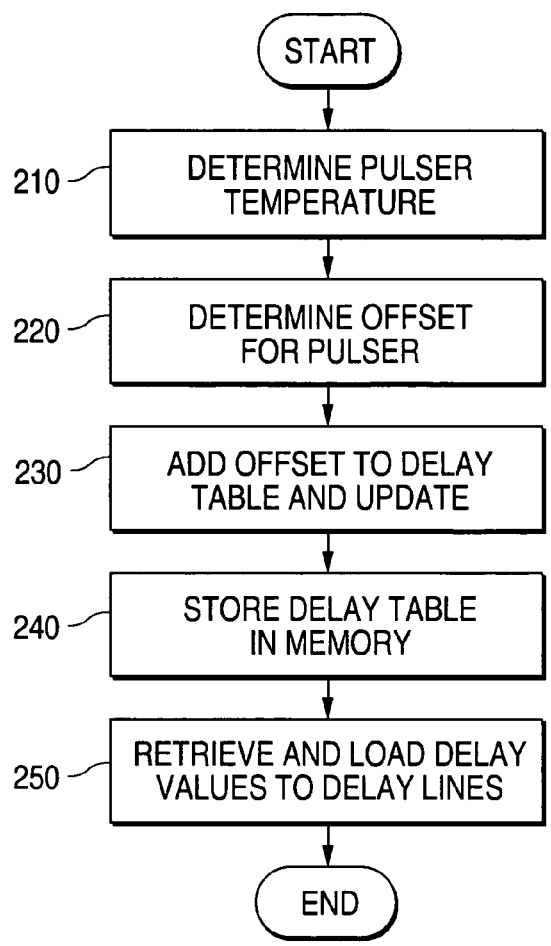
FIG. 3 is a flowchart illustrating delay compensation in accordance with the preferred embodiment.

FIG. 3 is a flowchart illustrating delay compensation in accordance with a preferred embodiment. Referring to FIG. 3, at step 210, the pulser temperature is determined, for example, by the temperature circuit 140 of FIG. 2. Thereafter at step 220, an offset for the pulser is determined. In one aspect, the offset for the pulser at step 220 is determined based on the temperature dependence of the ceramic capacitors on the delay, and as indicated below, other factors may be included such as the temperature of the gas mixture and/or other components of the laser system. In another embodiment described below, the temperature measurement step is not performed at all, and the offset determination step involves a determination of the time difference, which is understood as being influenced by deviations in these temperatures, between a trigger pulse and a feature, e.g., the leading edge or peak, of a temporal profile of the light pulse whose generation was initiated by the trigger pulse, and a comparison with a predetermined or stabilized delay value.

At step 230, the offset determined at step 220 is added to the delay table which, in one embodiment, may be in the format of a data file as a look-up table and stored in a storage device accessible by laser controller 130 of FIG. 2. More specifically, with the determined offset, the look-up table is updated in laser controller 130 and the updated look-up table is loaded for storage in memory such as a random access memory (RAM) in HV control board 120 of FIG. 2. As mentioned, a function including the offset value may be used to calculate the delay compensation value or values. Thereafter, the delay lines 121 are loaded with the delay values at step 250 retrieved from the memory in HV control board 120.

In this manner, in one embodiment, to maintain the delay between the external trigger pulse for a laser system and the light pulse constant and not varied by the HV, temperature or other parameters (for example, related to the material properties), the delay change may be compensated by adding a variable delay between the trigger pulse and the switch which initiates the pulse compression. Indeed, using digital delay lines, as discussed above, the variable delay in this manner may be controlled by the voltage and the temperature (or other impacting parameters) such that the total delay is maintained at a substantially constant level.

Figure 4:
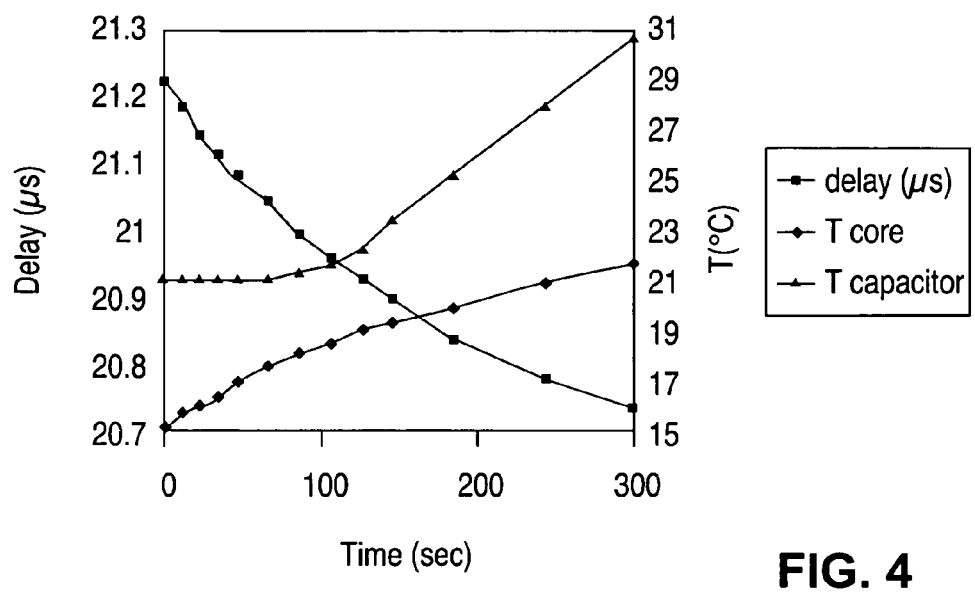
FIG. 4 is a graphical illustration of a delay—temperature relationship for capacitors and core of a discharge circuit according to a preferred embodiment.

FIG. 4 is a graphical illustration of the delay—temperature dependent relationship for a discharge circuit according to a preferred embodiment. Referring to FIG. 4, a typical temperature change after pulser start for the ceramic capacitors and in close vicinity of the cores and the resulting delay at constant HV is shown.

As discussed above, it is desired that in many laser applications, especially in lithography, the delay between the external trigger pulse for the laser and the light pulse be constant, and not changed by the HV, the temperature or any other parameters. Accordingly, in the manner described above, various embodiments described herein provide methods and systems for compensating the delay change by adding a variable delay between the trigger pulse and the pulser switch 170 of FIG. 2 which initiates the pulse compression. The variable delay is controlled by the voltage and the temperature or other parameters in such a manner that the total delay is maintained substantially constant. In one aspect, the variable delay may be implemented using the digital delay lines 121 of FIG. 2. In general, optical and/or electronic delay configurations may be used prior to or following the electric discharge that produces the laser output pulses (see, e.g., U.S. patent application Ser. No. 09/550,558, which is assigned to the same assignee as the present application and is hereby incorporated by reference).

Referring now to FIG. 5, a preferred embodiment will now be described that uses a measurement of the temporal profile of the generated light pulse for compensating the delay. The excimer or molecular fluorine laser system according to this preferred embodiment includes a detector configured to measure a temporal pulse shape of a split-off portion of the output beam of the laser. Alternative means for determining a timing between the trigger pulse and a feature of the temporal profile of the light pulse may be used, wherein perhaps less than the entire temporal profile is measured and/or monitored. In a preferred embodiment, that feature of the temporal profile, that is periodically compared with the timing of the trigger pulse to measure a delay value that is desired to be stabilized at a predetermined or stabilized value, is the leading edge of the temporal profile of the light pulse, and alternative features may include a peaks or maximum, a minimum, a falling edge, a leading or falling edge or maximum of a secondary peak with the temporal profile or another feature that is preferably more resolvable than not, so that the determination of the time difference between the trigger pulse and the measured feature of the temporal profile is more accurate than not.

According to the preferred embodiment, a processor receives a temporal pulse shape signal from the pulse shape detector indicative of the measured temporal pulse shape and preferably compares the received temporal pulse shape signal either with the trigger pulse, which is preferred, or with a reference temporal pulse shape signal stored in its memory and corresponding to a desired temporal pulse shape, i.e., wherein the temporal position of the feature, preferably the leading edge, is at a position corresponding to the desired delay. For example, the measurement "zero" of the temporal profile measurement may be controlled to occur at a same time after the trigger pulse for each measurement, such that the delay may be determined without referring back to the timing of the trigger pulse. The reference temporal pulse shape signal may in this case be anything from a full temporal profile to a partial profile to a time at which the feature, preferably the leading edge, is supposed to occur. The processor either simply computes an adjustment value and factors it into its delay compensation algorithm and/or look-up tables, or generates a deviation signal based on a difference between the monitored delay based on the measured leading edge and either the trigger pulse timing or the reference signal. In the latter case, the processor may then send the deviation signal to the appropriate component that utilized the information to control the delay.

The same or a different detector measures the energy of the split-off portion of the beam. In a one embodiment, a single detector measures the energy of the split off beam portion, and an oscilloscope resolves the temporal pulse shape. The pulse shape or pulse shape feature or timing signal is then received by the processor from the oscilloscope. The processor then also receives an energy signal directly from the detector indicating the measured energy of the beam, which is also used in determining the input high voltage of one or more successive pulses, so that the timing and intensity of the input electrical pulse to the laser discharge are determined so that the light pulse generated is emitted by the laser with a desired energy and at a desired time.

FIG. 5 shows a temporal pulse shape of the output beam of an excimer or molecular fluorine laser system. Several maxima are observed in the temporal pulse shape of FIG. 5, and as mentioned, a stable feature is most preferably used in the delay offset compensation determination. Two peaks are labeled as peak 1 and peak 2 in FIG. 5. The rising edge of peak 1 to the intensity maxima of peak 1 is what is referred to herein as the leading edge of the temporal profile, while at least three sub-peaks are shown in FIG. 5, each having its own leading edge, maxima and falling edge, in addition to at least two minima. Any point along this feature may be used to compare with the same feature of a reference profile that is the desired temporal distance from the trigger pulse or from the "zero" in FIG. 5, or other reference time value, if the "zero" or other time reference value is calibrated to the timing of the trigger pulse. Peak 2 is labeled in FIG. 5 to provide an example of a different feature of the temporal profile of the excimer or molecular fluorine laser light pulse that may be used in determining a delay compensation value for stabilizing the delay around a predetermined or stabilized value. The peak maximum position or rising or falling edge, etc., of peak 2 may be used instead of the rising edge of peak 1, e.g., if it becomes understood that the position of that feature of peak 2 is more reliably located at a temporal position with respect to a center of gravity of the temporal profile than the leading edge. Preferably, the most reliable such feature of the temporal profile is used. The temporal profile is even more preferably maintained substantially constant, e.g., by maintaining other features of the laser system such as the gas mixture substantially stable (see the '405 patent, mentioned above).

According to this preferred embodiment, then, a preferred method is provided including monitoring a temporal profile of a light pulse, or feature or timing thereof or a timing of a feature thereof, and a delay time between a trigger pulse that initiated the light pulse and the feature of the temporal profile, e.g., the leading or falling edge, a maxima of a peak within the profile, a center of gravity of the temporal profile or a sub-peak therein, etc., and controlling the delay time between the trigger pulse and the light pulse by controlling delay circuitry to stabilize the delay around a predetermined or stabilized value. In this way, such factors as temperature deviations of the capacitors and/or inductors of the pulser circuit (see FIG. 1), or of the gas mixture (see below with reference to FIG. 7) on the delay can be advantageously compensated with or without actually measuring one or more temperatures of components of the laser system.

The preferred embodiment described above may be combined with one or more techniques for stabilizing the delay time by controlling parameters that influence the delay time. For example, the temperatures of components such as capacitors and inductors within the pulser circuitry affect the delay time, and so these temperatures may be stabilized around more substantially constant values in order that fluctuations in these temperatures may be reduced or avoided. For example, a cooling fluid may be flowed, preferably at a selected variable temperature to maintain the pulser circuit components at a selected temperature. The temperature may be measured and sent to the processor which controls the temperature and/or flow rate of the cooling fluid in a feedback loop to maintain the temperature around the selected temperature.

Another parameter of an excimer or molecular fluorine laser system, which in this case is operated in burst mode, wherein a laser system that is operated in burst or continuous mode may benefit from the preferred embodiment described above, that affects its performance is energy overshoot. Energy overshoot is a burst mode pulse energy profile that spikes in the first few pulses and stabilized thereafter. As with the delay time fluctuations described above, thermal factors within the pulser circuit and elsewhere, e.g., within the gas mixture, among other factors, can influence the degree of this overshoot. Therefore in another embodiment, energy overshoot control is provided for an excimer or molecular fluorine laser system operating in burst mode.

Of particular interest in burst mode applications, the energy overshoot, as illustrated in FIG. 6a, is a significant characteristic. Energy overshoot, or spiking, is observed when the laser is operated with constant high voltage at the discharge chamber in burst mode and the first few pulses have higher energies than pulses later in the burst (see U.S. patent application Ser. No. 09/688,561, which is assigned to the same assignee as the present application, and U.S. Pat. Nos. 5,710,787, 6,084,897 and 5,463,650, which patent application and patents are all hereby incorporated by reference). The energy overshoot (designated "ovs" in FIG. 6a) is defined as the difference between the energy of the first pulse in a burst and the steady state energy in the entire burst.

There are potentially many factors that can determine the overshoot of a burst of gas discharge laser output pulses. Among these factors are the composition of the gas mixture (see FIGS. 6b–6c, and discussion below) and the temperature and/or temperature deviation of the laser gas mixture (see FIG. 7 and discussion below), and the temperature of the ceramic high voltage (HV) condensers of the pulser circuit (see immediately below).

The capacity of the ceramic HV condensers used in pulsed excimer or molecular fluorine gas discharge lasers depends on the temperature. The condensers tend to warm up during operation of the laser system, particularly at high repetition rates such as 1–4 kHz or more. For example, the condensers may warm up from room temperature to 60°–80° C. The capacity of the HV condensers becomes smaller with temperature at a rate of around 0.5%–1.0% per ° C. rise in temperature. Even when the laser is "warmed-up" prior to industrial application, e.g., photolithography, of the generated beam, the warmed-up condensers tend to cool down during burst pauses from these high operating temperatures relative to the ambient atmosphere in the fab. If the input high voltage to the discharge circuit is the same for pulses at the start of the burst, where overshoot occurs, as at the middle and end, or during the energy stabilized portion of the burst, then all else being equal, the energy of the generated light pulses will be higher at the start of the burst than during the energy stabilized portion due to this change in capacity of the ceramic condensers based on temperature.

A computer program is preferably used in a preferred excimer or molecular fluorine laser system, wherein a learning process is used, according to that described at U.S. patent application Ser. No. 09/688,561, incorporated by reference above. The computer monitors the energies of pulses in bursts to capture the behavior of the pulses. The computer then determines how to adjust the input high voltage values for pulses in the bursts so that the energies of the light pulses generated are substantially constant. One difficulty is that this overshoot control system can tend to be delayed relative to the warming up and cooling down of the laser system including the condensers, and has a clear problem with providing burst overshoot control for the initial burst or bursts used in the learning algorithm, wherein, e.g, each time an operational parameter is changed such as repetition rate, burst sequence, etc., the learning is performed again and the initial pulses in the first burst subject to the changed parameter may not have adequate overshoot control. When irregular burst patterns are used in general, the learning algorithm can be less than optimum for overshoot control performance.

In accordance with a preferred embodiment, the overshoot control is enhanced from the algorithms described at the '561 application. The condenser temperature is measured and a condenser temperature compensation factor is figured into the overshoot control algorithm. That is, the input high voltage is corrected by a condenser temperature compensation factor prior to application to the discharge. Preferably, the temperature is measured at or near a mass pole of the condenser, and the signal is sent to the control processor which factors the measured temperature into its calculation in determining the input HV values for a subsequent burst or bursts. For example, the dependence of the temperature on the capacity of the condensers is determined by calculation or referring to a look-up table by the processor. The energy, e.g., $E \approx CU^2/2$ is set to be approximately constant at a predetermined energy for the pulses beginning in a next or subsequent burst or bursts.

This embodiment for providing overshoot control may be combined with one or more techniques for controlling the overshoot by controlling parameters that influence the degree of overshoot. For example, the temperatures of components such as the ceramic HV condensers within the pulser circuitry affect the overshoot, as mentioned above, and so these temperatures may be stabilized around more substantially constant values in order that fluctuations in these temperatures may be reduced or avoided. For example, a cooling fluid may be flowed, preferably at a selected variable temperature to maintain the pulser circuit components at a selected temperature. The temperature may be measured and sent to the processor which controls the temperature and/or flow rate of the cooling fluid in a feedback loop to maintain the temperature around the selected temperature. Other factors such as the temperature and composition of the laser gas mixture may also be controlled to control/reduce the degree of overshoot, as described below.

FIG. 6b graphically illustrates the energy overshoot versus xenon gas additive concentration of a burst mode operation KrF laser as a percentage over the steady state output energy over entire bursts each including around 240 pulses. As shown in FIG. 6b, the overshoot percentage decreases with concentration of xenon additive (and/or other gas additive(s), see the '025 application, incorporated by reference above; and see Wakabayashi, et al., "Billion Level Durable ArF Excimer Laser with Highly Stable Energy," SPIE's 24th Annual International Symposium on Microlithography, Santa Clara, May 14–19, 1999; and R. S. Taylor and K. E. Leopold, "Transmission Properties of Spark Preionization Radiation in Rare-Gas Halide Laser Gas Mixes," IEEE Journal of Quantum Electronics, pp. 2195–2207, Vol. 31, No. 12 (December 1995); and U.S. Pat. No. 6,014,398, all of which are hereby incorporated by reference). The same generally can be applied to ArF and $F_2$ lasers.

FIG. 6c graphically shows an overshoot percentage versus pulse number in a burst of pulses for a laser system whose output pulse energies were measured and plotted with the laser system having a gas mixture including about 35 ppm of a xenon additive to an otherwise typical KrF laser gas mixture (see below with reference to FIG. 8). The KrF laser was operated at 2 KHz and the measured burst followed a 0.8 second pause. The overshoot is shown in FIG. 6c to be around 9–10% for the first pulse or pulses and rapidly decreases to around 3% after 5–10 pulses, and to around 2% after around 20 pulses. The overshoot is then shown to decease over the remainder of the burst, and at the last 50–100 pulses, the overshoot effect on the pulse energies is decreased substantially to zero. When no gas additive is present in the gas mixture, the overshoot can start out as high as 30% or more as described in the '025 application. In short, the burst overshoot defined as the average deviation of the first pulse in the burst from the steady-state energy value is advantageously reduced from 30% for the laser without xenon to less than 10% for the laser of FIG. 6c operating with xenon.

Xenon is used as a preferred example of a gas additive for a KrF laser, above, while overshoot control may be provided with a gas mixture including a small amount of xenon or another gas additive for a KrF or other gas discharge laser such as an ArF or $F_2$ laser. For example, the gas additive may be preferably xenon for an ArF laser, or krypton, and may be preferably xenon or argon for a KrF laser, and may be preferably xenon, argon or krypton for a $F_2$ laser. For the excimer or molecular fluorine laser, for stability reasons, the initial concentration of the gas additive is selected and may be adjusted in accordance with selected values of one or more of energy stability, overshoot control, and pulse energy (the '025 application, incorporated by reference above, provides further details and alternative embodiments along these lines).

Referring now to FIG. 7, a heat exchange system coupled with a gas discharge laser such as an excimer or molecular fluorine laser system is schematically illustrated (for more details, see U.S. patent application No. 60/281,305, which is assigned to the same assignee as the present application and is hereby incorporated by reference). The heat exchange system includes more than a single water flow loop for flowing water through the gas mixture at a constant speed and temperature. The heat exchange system of FIG. 7 preferably includes at least a first water source 308 and a second water source 311 that, respectively, serve to remove heat from and add heat to the gas mixture within the discharge chamber 301 having a discharge circuit 302 and temperature sensor 306 coupled thereto. A distributor 310 is preferably used to couple both the first and second water sources 308, 311 with the discharge chamber 301.

A controller 307 preferably controls the distributor 310 and preferably a control valve 305 of the first water source 308. The control valve 305 may be used to adjust the flow of the first water source to remove heat more or less rapidly (the second water source may be coupled with a corresponding such control valve). The controller 307 may receive gas mixture temperature information from a fast temperature sensor 306 based at least in part upon which the controller 307 handles the distributor 310 and/or control valve 305. The controller 307 may handle the distributor 310 and/or control valve 305 or otherwise control the heat exchange parameters of the system for stabilizing the temperature of the gas mixture based on the nature of the burst mode operation of the system. For example, the rate of heat removal may be reduced during a burst pause or heat may be added during a burst pause to compensate the lack of heat addition by the discharge, so that the temperature of the gas mixture is maintained at a same value at the first few pulses of a next burst as they were during the energy stabilized portion of the previous burst, so that a change in the temperature of the gas mixture has little or no effect on the overshoot.

General Description of Overall Laser System

FIG. 8 schematically illustrates an overall excimer or molecular fluorine laser system according to a preferred embodiment. Referring to FIG. 8, an excimer or molecular fluorine laser system is schematically shown according to a preferred embodiment. The preferred gas discharge laser system may be a VUV laser system, such as a molecular fluorine ($F_2$) laser system, for use with a vacuum ultraviolet (VUV) lithography system, or may be a DUV laser system such as a KrF or ArF laser system. Alternative configurations for laser systems for use in such other industrial applications as TFT annealing, photoablation and/or micromachining, e.g., include configurations understood by those skilled in the art as being similar to and/or modified from the system shown in FIG. 8 to meet the requirements of that application. For this purpose, alternative DUV or VUV laser system and component configurations are described at U.S. patent application Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/715,803, and 09/780,124, and U.S. Pat. Nos. 6,005,880, 6,061,382, 6,020,723, 5,946,337, 6,014,206, 6,157,662, 6,154,470, 6,160,831, 6,160,832, 5,559,816, 4,611,270, 5,761,236, 6,212,214, 6,154,470, 6,269,110, 6,219,368, 6,298,080, 6,243,405, 6,243,406, and 6,198,761, each of which is assigned to the same assignee as the present application and is hereby incorporated by reference.

The system shown in FIG. 8 generally includes a laser chamber 402 (or laser tube including a heat exchanger and fan for circulating a gas mixture within the chamber 402 or tube) having a pair of main discharge electrodes 403 connected with a solid-state pulser module 104, and a gas handling module 406. The gas handling module 406 has a valve connection to the laser chamber 402 so that halogen, rare and buffer gases, and preferably a gas additive, may be injected or filled into the laser chamber, preferably in premixed forms (see U.S. patent application Ser. No. 09/513,025, which is assigned to the same assignee as the present application, and U.S. Pat. No. 4,977,573, which are each hereby incorporated by reference) for ArF, XeCl and KrF excimer lasers, and halogen and buffer gases, and any gas additive, for the $F_2$ laser. For the high power XeCl laser, the gas handling module may or may not be present in the overall system. The solid-state pulser module 404, including preferably an IGBT switch, and alternatively a thyristor or other solid state switch, is powered by a high voltage power supply 408. A thyratron pulser module may alternatively be used. The laser chamber 402 is surrounded by optics module 410 and optics module 412, forming a resonator. The optics module may include only a highly reflective resonator reflector in the rear optics module 410 and a partially reflecting output coupling mirror in the front optics module 412, such as is preferred for the high power XeCl laser. The optics modules 410 and 412 may be controlled by an optics control module 414, or may be alternatively directly controlled by a computer or processor 416, particular when line-narrowing optics are included in one or both of the optics modules 410, 412, such as is preferred when KrF, ArF or $F_2$ lasers are used for optical lithography.

The processor 416 for laser control receives various inputs and controls various operating parameters of the system. A diagnostic module 418 receives and measures one or more parameters, such as pulse energy, average energy and/or power, and preferably wavelength, of a split off portion of the main beam 420 via optics for deflecting a small portion of the beam toward the module 418, such as preferably a beam splitter module 422. The beam 420 is preferably the laser output to an imaging system (not shown) and ultimately to a workpiece (also not shown) such as particularly for lithographic applications, and may be output directly to an application process. The laser control computer 416 may communicate through an interface 424 with a stepper/scanner computer, other control units 426, 428 and/or other external systems.

Laser Chamber

The laser chamber 402 contains a laser gas mixture and includes one or more preionization electrodes (not shown) in addition to the pair of main discharge electrodes 403. Preferred main electrodes 403 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent application Ser. No. 09/692,265 (particularly preferred for KrF, ArF, $F_2$ lasers), Ser. Nos. 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The laser chamber 402 is sealed by windows transparent to the wavelengths of the emitted laser radiation 420. The windows may be Brewster windows or may be aligned at another angle, e.g., 5°, to the optical path of the resonating beam. One of the windows may also serve to output couple the beam or as a highly reflective resonator reflector on the opposite side of the chamber 402 as the beam is outcoupled.

Solid State Pulser Module

Many preferred features of the solid state pulser module according to a preferred embodiment have been described above with reference to FIGS. 1–7, and some additional details and/or alternative embodiments are provided here and within references cited here. The solid-state or thyratron pulser module 404 and high voltage power supply 408 supply electrical energy in compressed electrical pulses to the preionization and main electrodes 403 within the laser chamber 402 to energize the gas mixture. Components of the preferred pulser module and high voltage power supply may be described at U.S. patent application Ser. Nos. 09/640,595, 60/198,058, 60/204,095, 09/432,348 and 09/390,146, and 60/204,095, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Laser Resonator

The laser resonator which surrounds the laser chamber 402 containing the laser gas mixture includes optics module 410 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 412, or a spectral filter external to the resonator is used, or if the line-narrowing optics are disposed in front of the HR mirror, for narrowing the bandwidth of the output beam. For a molecular fluorine laser, optics for selecting one of multiple lines around 157 nm may be used, e.g., one or more dispersive prisms or birefringent plates or blocks, wherein additional line-narrowing optics for narrowing the selected line may be left out. The total gas mixture pressure may be lower than conventional systems, e.g., lower than 3 bar, for producing the selected line at a narrow bandwidth such as 0.5 pm or less without using additional line-narrowing optics.

For the $F_2$ laser, line-selection optics are preferably included for selecting the main line at around $\lambda_1$=157.63094 nm and suppressing any other lines around 157 nm that may be naturally emitted by the $F_2$ laser. Therefore, in one embodiment, the optics module 410 has only a highly reflective resonator mirror, and the optics module 412 has only a partially reflective resonator reflector. In another embodiment, suppression of the other lines (i.e., other than $\lambda_1$) around 157 nm is performed, e.g., by an outcoupler having a partially reflective inner surface and being made of a block of birefringent material or a VUV transparent block with a coating, either of which has a transmission spectrum which is periodic due to interference and/or birefringence, and has a maximum at $\lambda_1$ and a minimum at a secondary line. In another embodiment, simple optics such as a dispersive prism or prisms may be used for line-selection only, and not for narrowing of the main line at $\lambda_2$. Other line selection embodiments are set forth at U.S. patent application Ser. Nos. 09/317,695, 09/657,396, and 09/599,130, each of which is assigned to the same assignee as the present application and is hereby incorporated by reference. The advantageous gas mixture pressure of the seed laser of the preferred embodiment enables a narrow bandwidth, e.g., below 0.5 pm, even without further narrowing of the main line at $\lambda_1$ using additional optics.

Optics module 412 preferably includes means for outcoupling the beam 420, such as a partially reflective resonator reflector. The beam 420 may be otherwise outcoupled such as by an intra-resonator beam splitter or partially reflecting surface of another optical element, and the optics module 412 would in this case include a highly reflective mirror. The optics control module 414 preferably controls the optics modules 410 and 412 such as by receiving and interpreting signals from the processor 416, and initiating realignment, gas pressure adjustments in the modules 410, 412, or reconfiguration procedures (see the '353, '695, '277, '554, and '527 applications mentioned above).

Diagnostic Module

After a portion of the output beam 420 passes the outcoupler of the optics module 412, that output portion preferably impinges upon a beam splitter module 422 which includes optics for deflecting a portion of the beam to the diagnostic module 418, or otherwise allowing a small portion of the outcoupled beam to reach the diagnostic module 418, while a main beam portion 420 is allowed to continue as the output beam 420 of the laser system (see U.S. patent application Ser. Nos. 09/771,013, 09/598,552, and 09/712,877which are assigned to the same assignee as the present invention, and U.S. Pat. No. 4,611,270, each of which is hereby incorporated by reference. Preferred optics include a beamsplitter 422 or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 418. A holographic beam sampler, transmission grating, partially transmissive reflection diffraction grating, grism, prism or other refractive, dispersive and/or transmissive optic or optics may also be used to separate a small beam portion from the main beam 420 for detection at the diagnostic module 418, while allowing most of the main beam 420 to reach an application process directly or via an imaging system or otherwise. These optics or additional optics may be used to filter out visible radiation such as the red emission from atomic fluorine in the gas mixture from the split off beam prior to detection.

The output beam 420 may be transmitted at the beam splitter module while a reflected beam portion is directed at the diagnostic module 418, or the main beam 420 may be reflected, while a small portion is transmitted to the diagnostic module 418. The portion of the outcoupled beam which continues past the beam splitter module is the output beam 420 of the laser, which propagates toward an industrial or experimental application such as an imaging system and workpiece for photolithographic applications.

The diagnostic module 418 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 422 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 418 is preferably a wavelength and/or bandwidth detection component such as a monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference. In accord with a preferred embodiment herein, the bandwidth and wavelength is monitored and controlled in a feedback loop including the processor 416, and the feedback loop may also include the gas handling module 406 and/or tunable optics of the resonator. The total pressure of the gas mixture in the laser tube 402 is controlled to a particular value for producing an output beam at a particular bandwidth.

Another preferred component of the diagnostic module includes a pulse shape detector, as mentioned above with reference to FIG. 5, and optionally an ASE detector, wherein some alternative details may be set forth at U.S. Pat. Nos. 6,243,405 and 6,243,406, which are hereby incorporated by reference, for controlling the delay compensation, and alternatively for other reasons such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosures

Particularly for the molecular fluorine laser system, and for the ArF laser system, an enclosure 430 preferably seals the beam path of the beam 420 such as to keep the beam path free of photoabsorbing species. Smaller enclosures 432 and 434 preferably seal the beam path between the chamber 402 and the optics modules 410 and 412, respectively, and a further enclosure 436 is disposed between the beam splitter 422 and the diagnostic module 418. Preferred enclosures are described in detail in U.S. patent application Ser. Nos. 09/598,552, 09/594,892 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

Processor Control

The processor or control computer 416 receives and processes values of some of the pulse shape, energy, ASE, energy stability, energy overshoot for burst mode operation, wavelength, spectral purity and/or bandwidth, among other input or output parameters of the laser system and output beam. The processor 416 also controls the line narrowing module to tune the wavelength and/or bandwidth or spectral purity, and controls the power supply and pulser module 404 and 408 to control preferably the moving average pulse power or energy, such that the energy dose at points on the workpiece is stabilized around a desired value. In addition, the computer 416 controls the gas handling module 406 which includes gas supply valves connected to various gas sources. Further functions of the processor 416 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 8, the processor 416 preferably communicates with the solid-state or thyratron pulser module 404 and HV power supply 408, separately or in combination, the gas handling module 406, the optics modules 410 and/or 412, the diagnostic module 418, and an interface 424. The laser resonator which surrounds the laser chamber 402 containing the laser gas mixture includes optics module 410 including line-narrowing optics for a line narrowed excimer or molecular fluorine laser, which may be replaced by a high reflectivity mirror or the like in a laser system wherein either line-narrowing is not desired, or if line narrowing is performed at the front optics module 412, or an spectral filter external to the resonator is used for narrowing the linewidth of the output beam. Several variations of line-narrowing optics are set forth in detail below.

Gas Mixture

The laser gas mixture is initially filled into the laser chamber 402 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513,025, 09/447,882, 09/418,052, and 09/588,561, each of which is assigned to the same assignee and is hereby incorporated by reference into the present application. The concentration of the fluorine in the gas mixture may range from 0.003% to 1.00%, and is preferably around 0.1%. For rare gas-halide laser such as an ArF or KrF laser, a rare gas concentration of between 0.03% to 10%, and preferably around 1%, is used. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Although in some places herein, the preferred embodiments are particularly drawn to use with a $F_2$ laser, some gas replenishment actions are described for gas mixture compositions of other systems such as ArF, KrF, and XeCl excimer lasers, wherein the ideas set forth herein may also be advantageously incorporated into those systems.

Also, the gas composition for the KrF, ArF or $F_2$ laser in the above configurations uses either helium, neon, or a mixture of helium and neon as a buffer gas. For the KrF laser, the buffer gas is preferably at least mostly neon. The concentration of fluorine in the buffer gas preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The rare gas concentration may be around 1% in the gas mixture, and may be larger if reduced total pressures are used. The addition of a trace amount of xenon, and/or argon, and /or oxygen, and/or krypton and/or other gases (see the '025 application) may be used for increasing the energy stability, burst control, and/or output energy of the laser beam. The concentration of xenon, argon, oxygen, or krypton in the mixture may range from 0.0001% to 0.1%, and would be preferably significantly below 0.1%. Some alternative gas configurations including trace gas additives are set forth at U.S. patent application Ser. No. 09/513,025 and U.S. Pat.

No. 6,157,662, each of which is assigned to the same assignee and is hereby incorporated by reference.

Preferably, a mixture of 5% $F_2$ in Ne with He as a buffer gas is used, although more or less He or Ne may be used. The total gas pressure is advantageously adjustable between 1500 and 4000 mbar for adjusting the bandwidth of the laser. The partial pressure of the buffer gas is preferably adjusted to adjust the total pressure, such that the amount of molecular fluorine in the laser tube is not varied from an optimal, pre-selected amount. The bandwidth is shown to advantageously decrease with decreased He and/or Ne buffer gas in the gas mixture. Thus, the partial pressure of the He and/or Ne in the laser tube is adjustable to adjust the bandwidth of the laser emission.

Gas Mixture Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 406 preferably including a vacuum pump, a valve network and one or more gas compartments. The gas handling module 406 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214 and 5,396,514 and U.S. patent application Ser. Nos. 09/447,882, 09/418,052, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Total pressure adjustments in the form of releases of gases or reduction of the total pressure within the laser tube 402 may also be performed. Total pressure adjustments may be followed by gas composition adjustments if it is determined that, e.g., other than the desired partial pressure of halogen gas is within the laser tube 402 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 406 connected to the laser tube 402 either directly or through an additional valve assembly, such as may include a small compartment for regulating the amount of gas injected (see the '459 application), may include a gas line for injecting a premix A including 1% $F_2$:99% Ne or other buffer gas such as He, and another gas line for injecting a premix B including 1% rare gas:99% buffer gas, for a rare gas-halide excimer laser, wherein for a $F_2$ laser premix B is not used. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 402 via the valve assembly, the fluorine concentration in the laser tube 402 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, and any and all other gas replenishment actions are initiated and controlled by the processor 416 which controls valve assemblies of the gas handling unit 406 and the laser tube 402 based on various input information in a feedback loop. These gas replenishment procedures may be used in combination with gas circulation loops and/or window replacement procedures to achieve a laser system having an increased servicing interval for both the gas mixture and the laser tube windows.

The halogen concentration in the gas mixture is maintained constant during laser operation by gas replenishment actions by replenishing the amount of halogen in the laser tube for the molecular fluorine, ArF, KrF or other excimer laser herein, such that these gases are maintained in a same predetermined ratio as are in the laser tube 402 following a new fill procedure. In addition, gas injection actions such as μHIs as understood from the '882 application, mentioned above, may be advantageously modified into micro gas replacement procedures, such that the increase in energy of the output laser beam may be compensated by reducing the total pressure. In contrast, or alternatively, conventional laser systems would reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube 402. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used for selecting the primary line $\lambda_1$ of the $F_2$ laser and/or for narrowing the linewidth of the primary line, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application No. 60/212,301, which is assigned to the same assignee and is hereby incorporated by reference). For the KrF and ArF lasers, line-narrowing optics are used for narrowing the broadband characteristic emission (e.g., around 400 pm) of each of these lasers. Exemplary line-narrowing optics contained in the optics module 410 include a beam expander, an optional interferometric device such as an etalon or otherwise as described in the Ser. No. 09/715,803 application, incorporated by reference above, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 410, the grating may be replaced with a highly reflective mirror, and a lower degree of dispersion may be produced by a dispersive prism or alternatively no line-narrowing or line-selection may be performed in the rear optics module 410. In the case of using an all-reflective imaging system, the laser may be configured for semi-narrow band operation such as having an output beam linewidth in excess of 0.6 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 410 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

One or more apertures may be included in the resonator for blocking stray light and matching the divergence of the resonator (see the '277 application). As mentioned above, the front optics module may include line-narrowing optics (see the Ser. Nos. 09/715,803, 09/738,849 and 09/718,809 applications, each being assigned to the same assignee as the present application and hereby incorporated by reference), including or in addition to the outcoupler element. Depending on the type and extent of line-narrowing and/or selection and tuning that is desired, and the particular laser that the line-narrowing optics are to be installed into, there are many alternative optical configurations that may be used other than those specifically described below with respect to FIGS. 1–7. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Line-narrowing optics may be used for further line-narrowing in combination with line-narrowing and/or bandwidth adjustment that is performed by adjusting/reducing the total pressure in the laser chamber. For example, a natural bandwidth may be adjusted to 0.5 pm by reducing the partial pressure of the buffer gas to 1000–1500 mbar. The bandwidth could than be reduced to 0.2 pm or below using line-narrowing optics either in the resonator or external to the resonator. Exemplary line-narrowing optics are contained in the optics module 410, or the rear optics module, include a beam expander, an optional etalon and a diffraction grating, which produces a relatively high degree of dispersion, for a narrow band laser such as is used with a refractive or catadioptric optical lithography imaging system. The line-narrowing package may include a beam expander and one or more etalons followed by an HR mirror as a resonator reflector.

Optical Materials

In all of the above and below embodiments, the material used for any dispersive prisms, the prisms of any beam expanders, etalons, laser windows and the outcoupler is preferably one that is highly transparent at wavelengths below 200 nm for the $F_2$ and ArF lasers, such as at the 157 nm and 193 nm output emission wavelengths of the molecular fluorine and ArF lasers, respectively. The materials are also capable of withstanding long-term exposure to ultra-violet light with minimal degradation effects. Examples of such materials are $CaF_2$, $MgF_2$, $BaF_2$, LiF and $SrF_2$, and in some cases fluorine-doped quartz may be used. Also, in all of the embodiments, many optical surfaces, particularly those of the prisms, may or may not have an anti-reflective coating on one or more optical surfaces, in order to minimize reflection losses and prolong their lifetime. For the KrF laser, the above materials, or other materials such as fused silica, that may be transparent around 248 nm, may be used.

Power Amplifier

A line-narrowed oscillator, e.g., as set forth above, may be followed by a power amplifier for increasing the power of the beam output by the oscillator. Preferred features of the oscillator-amplifier set-up may be as set forth at U.S. patent application Ser. Nos. 09/599,130 and 60/228,184, which are assigned to the same assignee and are hereby incorporated by reference. The amplifier may be the same or a separate discharge chamber 402. An optical or electrical delay may be used to time the electrical discharge at the amplifier with the reaching of the optical pulse from the oscillator at the amplifier. The laser oscillator may have an output coupler having a transmission interference maximum at $\lambda_1$ and a minimum at $\lambda_2$, of multiple lines of emission of a molecular fluorine laser around 157 nm. The 157 nm beam may be output from the output coupler and then incident at the amplifier of this embodiment to increase the power of the beam. Thus, a very narrow bandwidth beam is achieved with high suppression of the secondary line $\lambda_2$ and high power (at least several Watts to more than 10 Watts). According to the 184 application, the oscillator may be operated at low gas mixture pressure for providing a narrow bandwidth beam, while line-narrowing optics may or may not be included. An low pressure excimer or molecular fluorine gas lamp may be used for emitting ultraviolet light that may be amplified at the amplifier, as well.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. In an excimer or molecular fluorine laser system, a method for controlling a time interval between a trigger pulse and light pulse, the method comprising:
   (a) generating a trigger pulse which initiates a process of generating a first light pulse from the laser;
   (b) transmitting a first signal to a digital time measuring circuit when the trigger pulse is generated;
   (c) transmitting a second signal to the digital time measuring circuit at a time which corresponds to the generation of the first light pulse;
   (d) operating the digital time measuring circuit to generate an interval signal which is a digital representation of the elapsed time between the receipt of the first and second signals; and
   (e) determining a first time delay adjustment for a delay circuit based on the interval signal, the first time delay adjustment to be used in adjusting a subsequent time interval between the generation of a subsequent trigger pulse and a subsequent generation of a subsequent light pulse.

2. The method of claim 1, wherein the determining the first time delay adjustment includes transmitting the interval signal to a microprocessor, wherein the microprocessor determines the first time delay adjustment based on the interval signal.

3. The method of claim 1 further comprising:
   applying a high voltage to a discharge circuit;
   wherein the discharge circuit applies an electrical pulse across electrodes of a laser chamber in response to the discharge circuit receiving the trigger pulse;
   discharging the electrical pulse across electrodes of the laser chamber;
   sensing the discharge of the electrical pulse across the electrodes; and
   transmitting the second signal to the digital time measuring circuit when the discharge of the electrical pulse is sensed.

4. The method of claim 1 further comprising:
   applying a high voltage to a discharge circuit;
   wherein the discharge circuit applies an electrical pulse across electrodes of a laser chamber in response to the discharge circuit receiving the trigger pulse;
   discharging the electrical pulse across electrodes of the laser chamber; and
   determining a second time delay adjustment based on at least the value of the high voltage applied to the discharge circuit.

5. The method of claim 1 further comprising:
   sensing when the light pulse is generated; and
   wherein the second signal is sent to the digital time measuring circuit when the light pulse is sensed.

6. The method of claim 1, further including:
   applying a high voltage to a discharge circuit;
   wherein the discharge circuit applies an electrical pulse across electrodes of a laser chamber in response to the discharge circuit receiving the trigger pulse;
   discharging the electrical pulse across electrodes of the laser chamber; and
   determining a second time delay adjustment based on a value of the high voltage applied to the discharge circuit.

7. The method of claim 1 wherein the determining the first time delay adjustment includes transmitting the interval signal to a microprocessor, and programming the microprocessor to determine an adjustment to the delay circuit based on the interval signal.

8. A delay control system for an excimer or molecular fluorine laser system for controlling a time interval between a trigger pulse and a light pulse, comprising:
   a trigger pulse generator, which generates the trigger pulse;
   a discharge circuit which includes a switch which receives the trigger pulse, and in response to the switch receiving the trigger pulse the discharge circuit outputs an electrical pulse;
   a laser chamber including electrodes, wherein the electrodes receive the electrical pulse from the discharge circuit, and a light pulse is emitted in response the electrical pulse being discharged across the electrodes; and
   a digital time measuring circuit which receives a first signal which corresponds to when the trigger pulse is generated, and receives a second signal which corresponds to when the electrical pulse is discharged across the electrodes, and wherein the digital time measuring circuit generates an interval signal which corresponds to a time difference between the first signal and the second signal; and
   a processor which receives the interval signal and based on the interval signal determines a first adjustment to a delay circuit to adjust a subsequent time interval between the generation of a subsequent trigger pulse and a subsequent discharge of an electrical pulse across the electrodes.

9. The delay control system of claim 8 further comprising:
   a sensor positioned to sense when the electrical pulse is discharged across the electrodes, and wherein the sensor is coupled to the digital time control circuit to transmit the second signal to the digital time control circuit when the sensor senses the electrical pulse is discharged across the electrodes.

10. The delay control system of claim 8 further comprising:
   a sensor positioned to sense when the light pulse is emitted in response the electrical pulse being discharged across the electrodes, and wherein the sensor is coupled to the digital time control circuit to transmit the second signal to the digital time control circuit when the sensor senses the light pulse.

11. The delay control system of claim 8 further comprising:
   a high voltage charging circuit which applies a high voltage potential to the discharge circuit; and
   wherein the high voltage charging circuit is coupled to the processor such that the processor receives a signal which corresponds to the high voltage applied to the discharge circuit, and wherein the processor determines a second time delay adjustment based on a value of the high voltage applied to the discharge circuit.

12. The delay control system of claim 8 further comprising:
   a high voltage charging circuit which applies a high voltage potential to the discharge circuit; and
   wherein the high voltage charging circuit is coupled to a second processor such that the second processor receives a signal which corresponds to the high voltage applied to the discharge circuit, and wherein the second processor determines a second time delay adjustment based on a value of the high voltage applied to the discharge circuit, and inputs the second time delay adjustment to a second delay circuit to control a time interval between a trigger pulse and a discharge of an electrical pulse across the electrodes.

13. An excimer or molecular fluorine laser system including a delay control for controlling a time interval between a trigger pulse and light pulse, the laser system including:
   a high voltage power supply;
   a discharge circuit which includes a switch which receives the trigger pulse, and in response to the switch receiving the trigger pulse the discharge circuit outputs an electrical pulse, wherein the discharge circuit is coupled to the high voltage power supply such that the high voltage power supply applies a high voltage to the discharge circuit;
   a trigger pulse generator, which generates the trigger pulse, wherein trigger pulse generator is coupled to the switch;
   a laser chamber including electrodes, wherein the electrodes are coupled to the discharge circuit to receive the electrical pulse from the discharge circuit, and to discharge the electrical pulse across electrodes whereby a light pulse is emitted in response the electrical pulse being discharge across the electrodes;
   a first delay circuit coupled between the trigger pulse generator and the switch; and
   a digital time measuring circuit which receives a first signal which corresponds to when the trigger pulse is generated, and receives a second signal which corresponds to when the electrical pulse is discharged across the electrodes, and wherein the digital time measuring circuit generates an interval signal which corresponds to a time difference between the first signal and the second signal;
   a processor which receives the interval signal and based on the interval signal controls the first delay circuit to adjust a subsequent time interval between the generation of a subsequent trigger pulse and a subsequent discharge of the electrical pulse across the electrodes.

14. The laser system of claim 13 further including:
   a second delay circuit coupled between the trigger pulse generator and the switch; and
   the processor is coupled to the discharge circuit such that it receives a signal which corresponds to the high voltage applied to the discharge circuit, and wherein the processor is coupled to the second delay circuit, and operable to adjust the second delay circuit to control a time interval between a trigger pulse and a discharge of an electrical pulse across the electrodes, based on the signal which corresponds to the high voltage signal.

* * * * *